(12) United States Patent
Nishi et al.

(10) Patent No.: US 7,146,102 B2
(45) Date of Patent: Dec. 5, 2006

(54) OPTICAL CROSS-CONNECT DEVICE

(75) Inventors: Tetsuya Nishi, Kawasaki (JP); Satoshi Kuroyanagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 766 days.

(21) Appl. No.: 10/265,255

(22) Filed: Oct. 7, 2002

(65) Prior Publication Data

US 2003/0185566 A1 Oct. 2, 2003

(30) Foreign Application Priority Data

Mar. 28, 2002 (JP) ............................ 2002-093188

(51) Int. Cl.
*H04J 14/00* (2006.01)

(52) U.S. Cl. ............................ 398/45; 398/50; 398/56

(58) Field of Classification Search .................. 398/45, 398/50, 56, 12, 19, 79
See application file for complete search history.

(56) References Cited

U.S. PATENT DOCUMENTS

| 6,424,445 | B1 * | 7/2002 | Tsushima et al. ............ 398/177 |
| 6,433,900 | B1 * | 8/2002 | Kuroyanagi et al. .......... 398/19 |
| 2002/0015551 | A1 * | 2/2002 | Tsuyama et al. .............. 385/17 |

FOREIGN PATENT DOCUMENTS

JP 9-238370 9/1997

* cited by examiner

*Primary Examiner*—M. R. Sedighian
(74) *Attorney, Agent, or Firm*—Staas & Halsey LLP

(57) ABSTRACT

Each piece of WDM light transmitted via the first and second line is demultiplexed for each wavelength by the first and second optical demultiplexer, and is selected by n optical selectors. Each selected optical signal is split by n optical splitters and is input to one set of optical switches. Each one of optical signals from the set of optical switches is selected by n optical selectors. Furthermore, each selected optical signal is regenerated by n wavelength converters. Each regenerated optical signal is split by n optical splitters, and is multiplexed by the first and second optical multiplexers.

20 Claims, 31 Drawing Sheets

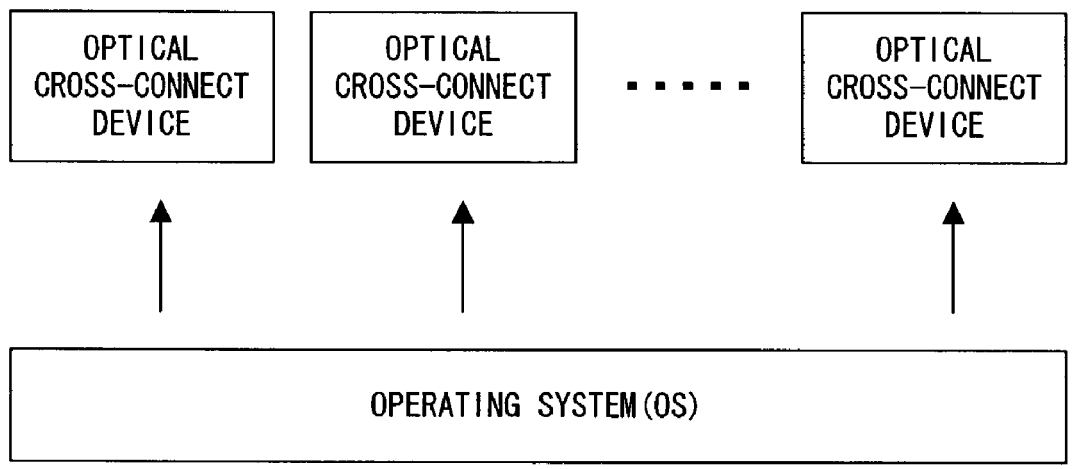
F I G. 4 A
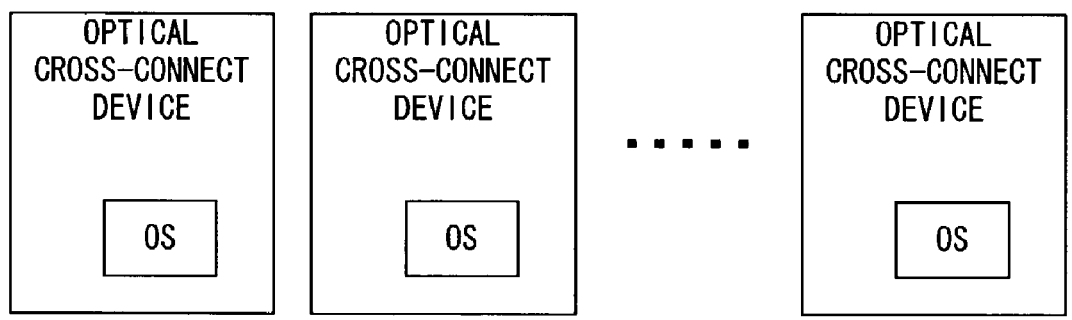
F I G. 4 B

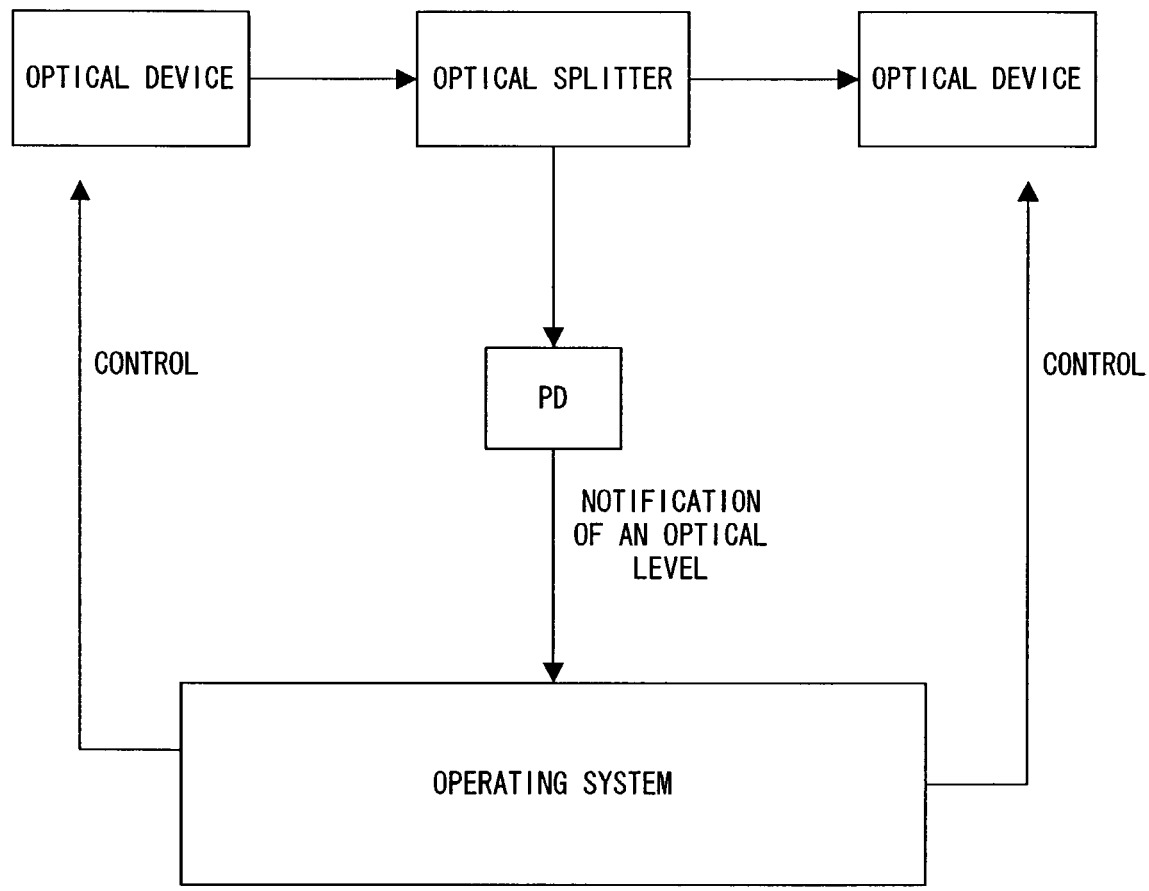
F I G. 8

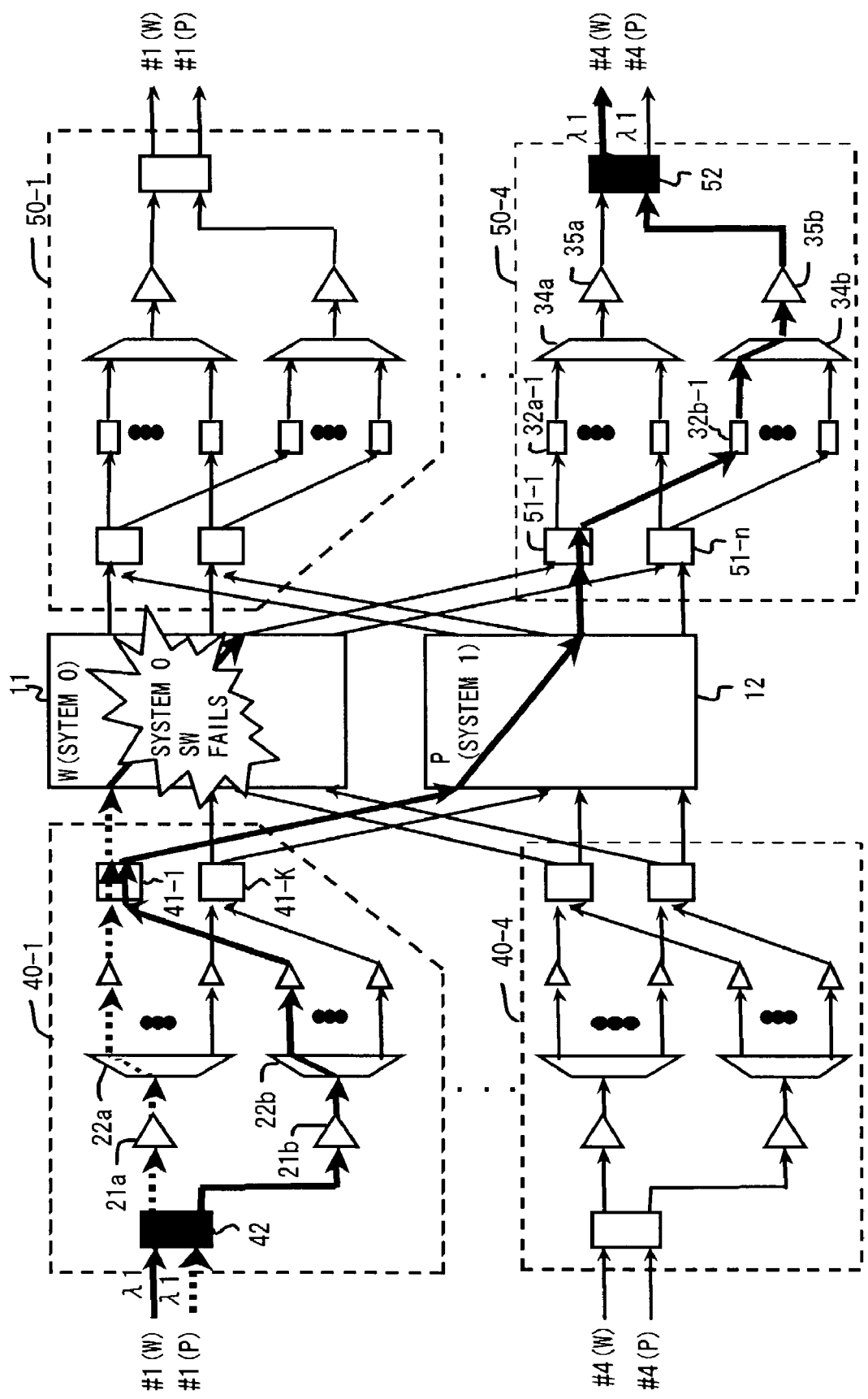
F I G. 14

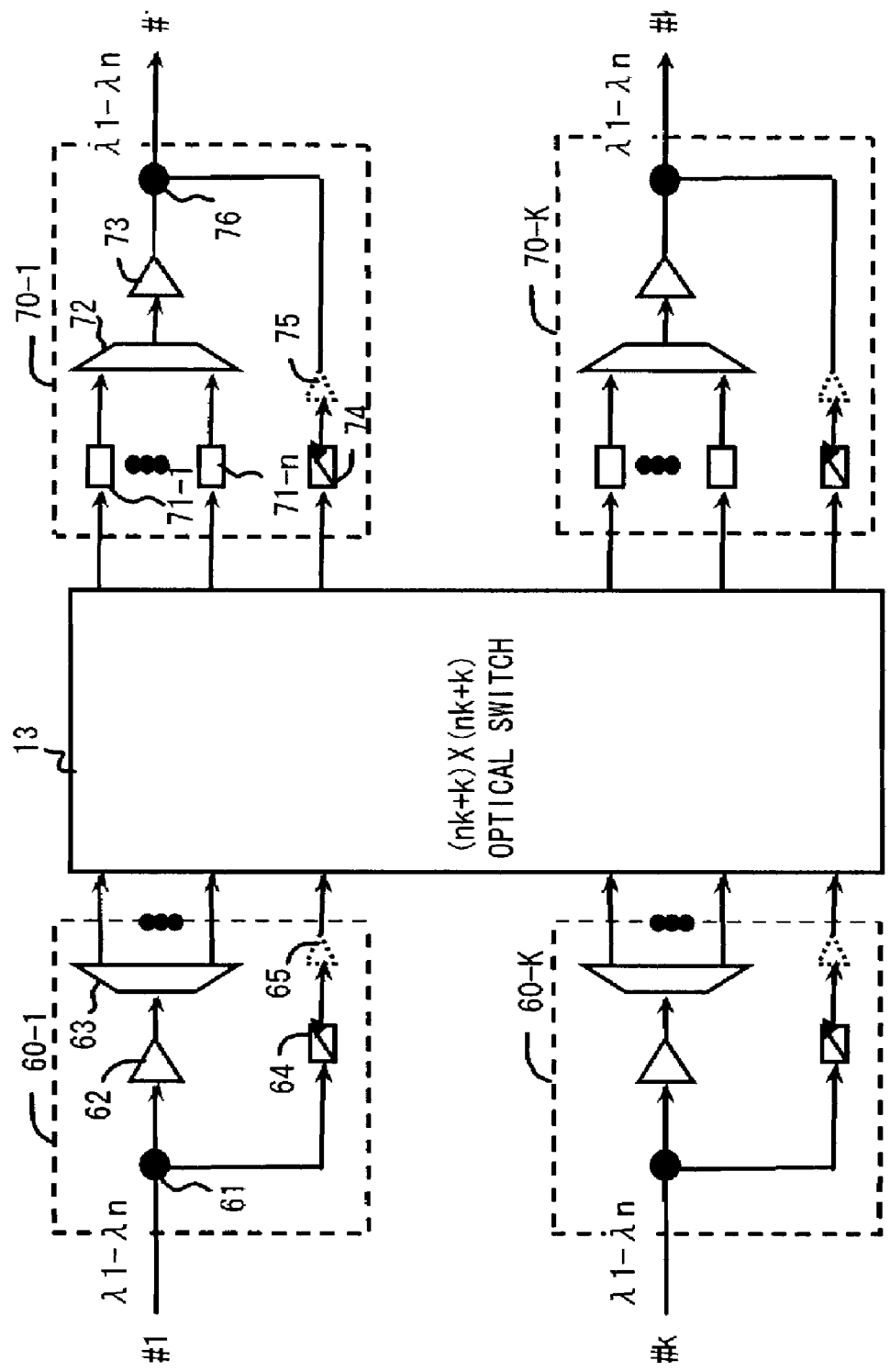
F I G. 15

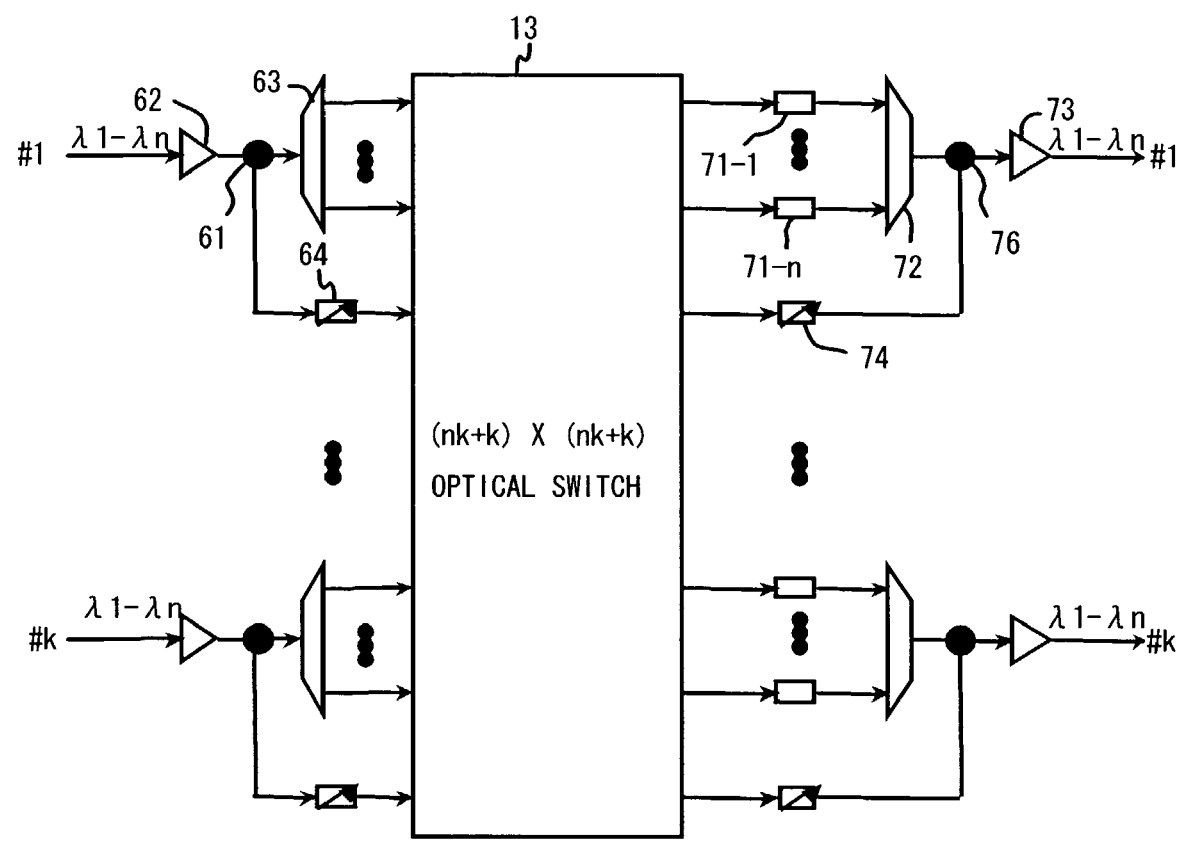
F I G. 16

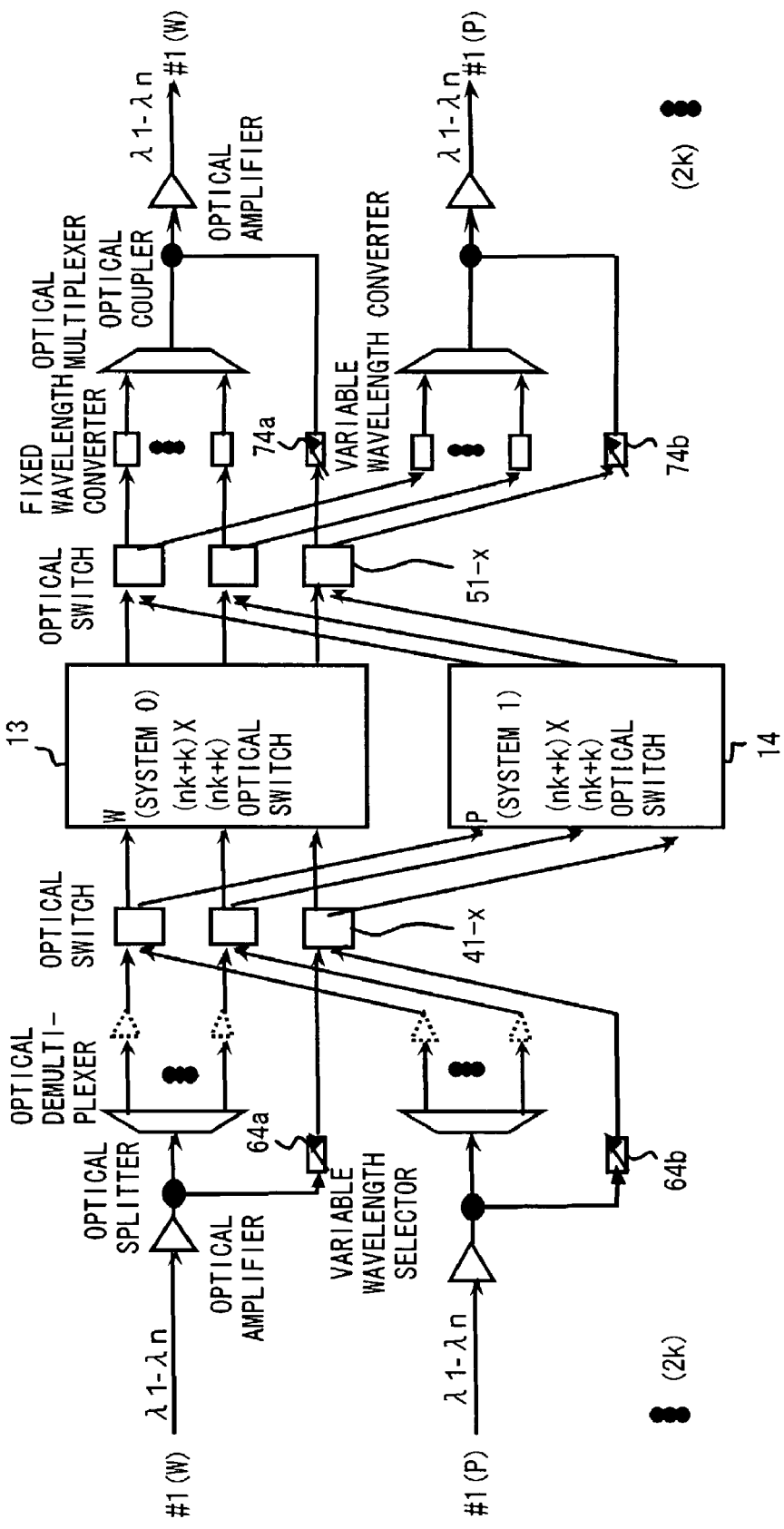
F I G. 20

US 7,146,102 B2

OPTICAL CROSS-CONNECT DEVICE

BACKGROUND OF THE INVENTION

1. Field of the Invention

The present invention relates to an optical cross-connect device with a redundant configuration, and in particular, relates to an optical cross-connect device with a redundant configuration that is used in a wavelength-division multiplex optical communications system.

2. Description of the Related Art

With the advent of high-speed/large-capacity data transmission, broadband/large-capacity networks and communication devices are in high demand. In such a situation, the construction of an optical network based on a WDM (wavelength-division multiplexing) technology is desired as one method for realizing the broadband/large capacity networks and communications devices. A core device in constructing such an optical network is an optical cross-connect device. In the following description, the optical cross-connect device is sometimes called an "optical XC".

FIG. 1 shows a network environment in which an optical cross-connect device is used. In this case, this optical network comprises a plurality of optical cross-connect devices connected to one another through an optical transmission line. WDM light is transmitted through an optical transmission line connecting the optical cross-connect devices. WDM light includes a plurality of wavelengths $\lambda 1$ through $\lambda n$.

An optical cross-connect device 500 accommodates a plurality of input-side optical inter-station transmission lines and a plurality of output-side optical inter-station transmission lines. Here, WDM signal light is transmitted through each inter-station transmission line. The optical cross-connect device 500 guides WDM signal light received through the input-side optical inter-station transmission line to a designated output-side optical inter-station transmission line for each destination or wavelength. If the distance between the optical cross-connect devices is long, one or more optical amplifiers are inserted in the optical inter-station transmission line. The optical cross-connect device 500 is also often connected to a switch (for example, electric cross-connect device, etc.) accommodating subscriber lines. Then, the optical cross-connect device 500 is controlled by an operating system managing the entire network.

The number of wavelengths of WDM signal light transmitted between the optical cross-connect devices in the optical network has been increasing every year. Therefore, if the optical cross-connect device fails, its influence on communication services becomes very serious. For this reason, the optical cross-connect device is redundantly configured so as to promptly recover from a failure that occurs inside the device.

FIG. 2 shows the configuration of an existing optical cross-connect device. This optical cross-connect device comprises one set of switches (switch units 501-W(0) and 501-P(1)). The optical inter-station transmission path of an optical network in which this optical cross-connect device is used is also duplicated. Specifically, one set of optical inter-station transmission lines (systems 0 and system 1) through which signals are transmitted from one optical cross-connect device to another, and one set of optical intra-station transmission lines (systems 0 and system 1) through which signals are transmitted in the opposite direction are installed between every pair of optical cross-connect devices. In this example, it is assumed that identical signals are transmitted through one set of optical inter-station transmission lines. That is to say, the signal transmitted through one of the set of optical inter-station transmission lines is the same as the signal transmitted through the other one of the set of optical inter-station transmission lines.

WDM signal light ($\lambda 1$ through $\lambda n$) received through one set of the optical inter-station transmission lines (systems 0 and system 1) is amplified by an optical amplifier 502 and is demultiplexed for each wavelength by a demultiplexer 503. Each piece of signal light demultiplexed for each wavelength is branched into one set of signal light by an optical coupler 504, which is used as an optical splitter. One piece of signal light split by the optical coupler 504 is sent to a 2×1 switch 505 installed on the input side of the switch unit 501-W(0), and the other piece of signal light is sent to a 2×1 switch 505 installed on the input side of the switch unit 501-P(1). Thus, both of the signal light received through system-0 optical inter-station transmission line and the signal light received through system-1 optical inter-station transmission line are input to each 2×1 switch 505.

The 2×1 switch 505 selects one piece of signal light and outputs the signal to the corresponding switch units (501-W(0), 501-P(1)). Then, each of the switch units 501-W(0) and 501-P(1) performs routing processes on the incoming signal light according to the instructions of the operating system.

Each piece of signal light output from the switch units 501-W(0) or 501-P(1) is split into one set of signal light by an optical coupler 506 used as an optical splitter. One piece of signal light split by the optical coupler 506 is sent to a 2×1 switch 507 corresponding to the system-0 optical inter-station transmission line, and the other piece of signal light is sent to a 2×1 switch 507 corresponding to the system-1 optical inter-station transmission line. Thus, both of the signal light guided by the switch unit 501-W(0) and the signal light guided by the switch unit 501-P(1) are input to each 2×1 switch 507.

The 2×1 switch 507 selects and outputs one piece of signal light. The signal light output from the 2×1 switch 507 is regenerated by an optical regenerator 508. Then, the signal light regenerated for each wavelength is multiplexed by a multiplexer 509 and is output to a corresponding optical inter-station transmission line as WDM signal light. At this time, the WDM signal light is amplified by an optical amplifier 510.

As described above, in the existing optical cross-connect device, signal light received through an optical inter-station transmission line is guided to both of the switch units 501-W(0) and 501-P(1). Then, one of the two pieces of signal light individually routed by the switch units 501-W(0) and 501-P(1) is selected and guided to an output-side optical inter-station transmission line. In other words, the path established inside the optical cross-connect device is duplicated. Therefore, if one path cannot be used due to the failure of an optical parts in the optical cross-connect device, the device can promptly recover from the failure by using the other path.

However, in the existing optical cross-connect device shown in FIG. 2, the optical regenerator 508 is provided for each output-side optical inter-station transmission line. Here, as shown in FIG. 2, the optical regenerator 508 is provided for each wavelength. Since in recent WDM optical transmission systems, the number of wavelengths multiplexed has been increased, the number of optical regenerators 508 needed for each optical inter-station transmission line has also been increasing proportionally. Furthermore, generally the optical regenerator 508 is fairly expensive. As a result, the size and cost of the optical cross-connect device have been increasing.

In addition, in the existing optical cross-connect device shown in FIG. 2, two optical couplers and two selectors (2×1 switches) are provided in the path from an input port to an output port. For this reason, the optical loss inside the optical cross-connect device becomes large. Therefore, requirements on an optical amplifier (gain, etc.) become severe.

SUMMARY OF THE INVENTION

It is an object of the present invention to miniaturize an optical cross-connect device with a redundant configuration. It is another object of the present invention to reduce the optical loss of an optical cross-connect device.

The optical cross-connect device of the present invention accommodates a plurality of sets of duplicated input transmission lines and a plurality of sets of duplicated output transmission lines, and comprises a first main switch, a second main switch, a plurality of input circuits provided for corresponding duplicated input transmission line and a plurality of output circuits provided for corresponding duplicated output transmission line. Each of the input circuit further comprises a first demultiplexer for demultiplexing WDM light received from a first input transmission line in a corresponding duplicated input transmission line for each wavelength; a second demultiplexer for demultiplexing WDM light from a second input transmission line in the corresponding duplicated input transmission line for each wavelength; a plurality of first selectors, provided for each wavelength, each of said plurality of first selectors selecting either an optical signal from said first demultiplexer or an optical signal from said second demultiplexer; and a plurality of optical first splitters, each of said plurality of optical first splitters splitting an optical signal selected by corresponding first selectors and guiding the split signals to said first main switch and said second main switch, respectively. Each of the output circuits further comprises: a plurality of second selectors, each of said plurality of second selectors selecting either an optical signal from said first main switch or an optical signal from said second main switch; a plurality of regenerators, each of said plurality of regenerators regenerating an optical signal with a respective output wavelength based on an optical signal selected by corresponding second selector; a first multiplexer multiplexing a plurality of optical signals and guiding the multiplexed signal to a first output transmission line in a corresponding duplicated output transmission line; a second multiplexer multiplexing a plurality of optical signals and guiding the multiplexed signal to a second output transmission line in the corresponding duplicated output transmission line; and a plurality of second splitters, each of said plurality of second splitters splitting an optical signal generated by corresponding generator and guiding the split signals to said first multiplexer and said second multiplexer, respectively.

According to this configuration, each optical signal is split in such a way that the split signals are guided to corresponding line in the duplicated output transmission line after being regenerated by the corresponding generators. Therefore, the device can promptly recover from the failure of the main switch without duplicating the generators.

The optical cross-connect device in another aspect of the present invention comprises a first main switch, the second main switch, a plurality of input circuits and a plurality of output circuits like the optical cross-connect device described above. Each of said input circuits further comprises: a first demultiplexer for demultiplexing WDM light received from a first input transmission line in a corresponding duplicated input transmission line for each wavelength; a second demultiplexer for demultiplexing WDM light received from a second input transmission line in the corresponding duplicated input transmission line for each wavelength; and a plurality of first optical switches, provided for each input wavelength, each of said plurality of first optical switches guiding one of optical signals from said first demultiplexer and said second demultiplexer to said first main switch and guiding the other optical signal to said second main switch. Each of said output circuits further comprises: a first multiplexer multiplexing a plurality of optical signals and guiding the multiplexed signal to a first output transmission line in a corresponding duplicated output transmission line; a second multiplexer multiplexing a plurality of optical signals and guiding the multiplexed signal to a second output transmission line in the corresponding duplicated output transmission line; and a plurality of second optical switches, each of said plurality of second optical switches guiding one of optical signals from said first main switch and said second main switch to said first multiplexer and guiding the other optical signal to said second multiplexer.

According to this configuration, since WDM light or an optical signal is not split inside the optical cross-connect device, the optical loss is suppressed.

The optical cross-connect device in still another aspect of the present invention accommodates a plurality of input transmission lines and a plurality of output transmission lines, and comprises a main switch, a plurality of input circuits provided for each input transmission line and a plurality of output circuits provided for each output transmission line. Each of said input circuits further comprises: a splitter for splitting WDM light received through a corresponding input transmission line to generate first WDM light and second WDM light; a demultiplexer for demultiplexing the first WDM light for each wavelength and inputting the demultiplexed lights to said main switch; and a selector for selecting an optical signal with a designated wavelength from the second WDM light and inputting the selected signal to said main switch. Each of said output circuits further comprises: a plurality of fixed wavelength converters, each of said plurality of fixed wavelength converters converting a wavelength of an optical signal from the main switch into a corresponding wavelength; a multiplexer for multiplexing optical signals from said plurality of fixed wavelength converters to output WDM light; a variable wavelength converter for converting a wavelength of an optical signal from said main switch into a designated wavelength; and a coupler for combining the WDM light from said multiplexer with an optical signal from the variable wavelength converter, and guiding them to a corresponding output transmission line.

According to this configuration, when an optical device corresponding to an arbitrary wavelength included in the WDM light fails in the input circuit, the selector selects an optical signal with that wavelength from the WDM light and inputs the selected signal to the main switch. When an optical device corresponding to an arbitrary wavelength included in the WDM light fails in the output circuit, the variable wavelength converter generates the optical signal with that wavelength. Therefore, the redundancy of a line interface unit can be realized with a minimum necessary configuration.

BRIEF DESCRIPTIONS OF THE DRAWINGS

FIGS. 4A and 4B show examples of an operating system which controls the operation of each optical cross-connect device.

FIG. 8 shows how to trouble-shoot the optical cross-connect device.

FIG. 14 shows the operation of the third embodiment of the optical cross-connect device (at the time of failure).

FIG. 15 shows a fourth embodiment of the optical cross-connect device.

FIG. 16 shows a fifth embodiment of the optical cross-connect device.

FIG. 20 shows a ninth embodiment of the optical cross-connect device.

DESCRIPTIONS OF THE PREFERRED EMBODIMENTS

The preferred embodiments of the present invention are described below with reference to the drawings.

Figure 3:
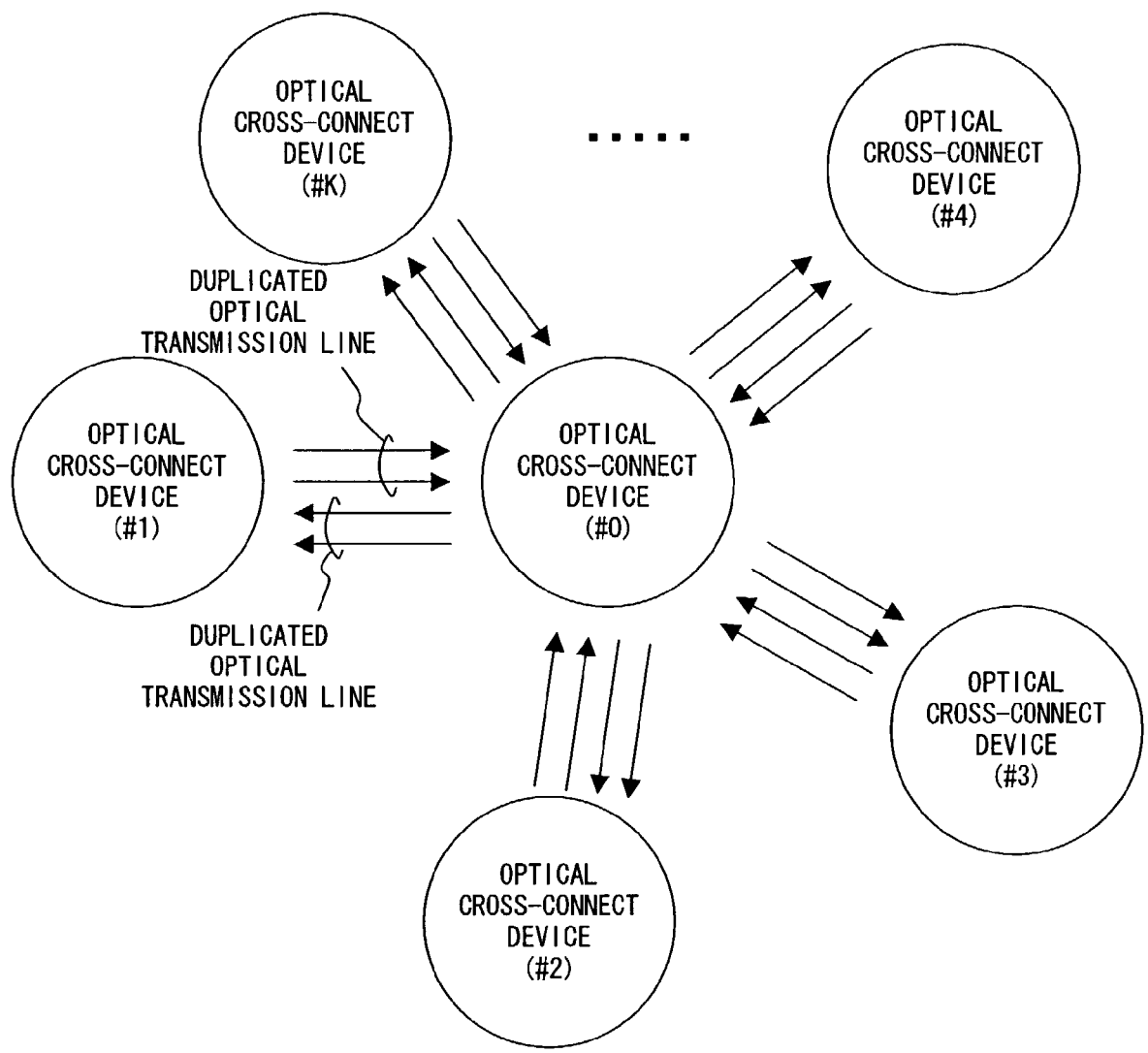
FIG. 3 shows a network in which the optical cross-connect device of the embodiment is used.

FIG. 3 shows a network in which the optical cross-connect device of the present invention is used. This network comprises k+1 optical cross-connect devices (#0 through #k). The optical cross-connect devices (#0 through #k) are basically connected to one another in a meshes shape, which is omitted for convenience's sake. Alternatively, the optical cross-connect devices can also be connected to one another in a ring shape.

Four optical transmission lines are laid between every two optical cross-connect devices. Specifically, a duplicated optical transmission line transmitting optical signals from one optical cross-connect device to the other optical cross-connect device and another duplicated optical transmission line transmitting optical signals in the opposite direction are laid between every two optical cross-connect devices. For example, k sets of duplicated optical transmission lines transmitting optical signals from each of optical cross-connect devices (#1, #2, #3, . . . , #k) to an optical cross-connect device (#0) and k sets of duplicated optical transmission lines transmitting optical signals from the optical cross-connect device (#0) to each of the optical cross-connect devices (#1, #2, #3, . . . , #k) are connected to the optical cross-connect device (#0). In other words, each optical cross-connect device accommodates k sets of duplicated input optical transmission lines and k sets of duplicated output optical transmission lines.

Each duplicated optical transmission line can transmit identical optical signals or different optical signals. In the following description, one set of transmission lines constituting a duplicated optical transmission line is called "system 0 line/system 1 line" or "working line/protection line". Each optical cross-connect device can also accommodate subscriber lines, which are not shown in FIG. 3.

FIGS. 4A and 4B show examples of an operating system which controls the operation of each optical cross-connect device. In this case, the operating system controls the operation (routing process, recover operation at the time of failure, etc.) of each optical cross-connect device. As shown in FIG. 4A, the operating system can be configured in such a way that a plurality of or all optical cross-connect devices are collectively controlled. Alternatively, as shown in FIG. 4B, an operating system can be individually provided for each optical cross-connect device.

Next, the configuration and operation of the optical cross-connect device are described. In the following description, it is assumed that the optical cross-connect device accommodates a plurality of sets of duplicated input optical transmission lines and a plurality of sets of duplicated output optical transmission lines and that WDM light is transmitted through the optical transmission lines. In this case, each WDM light includes a plurality of optical signals with different wavelengths $\lambda 1$ through $\lambda n$. However, there is no need for all the wavelengths $\lambda 1$ through $\lambda n$ to be simultaneously used.

The First Embodiment

Figure 5:
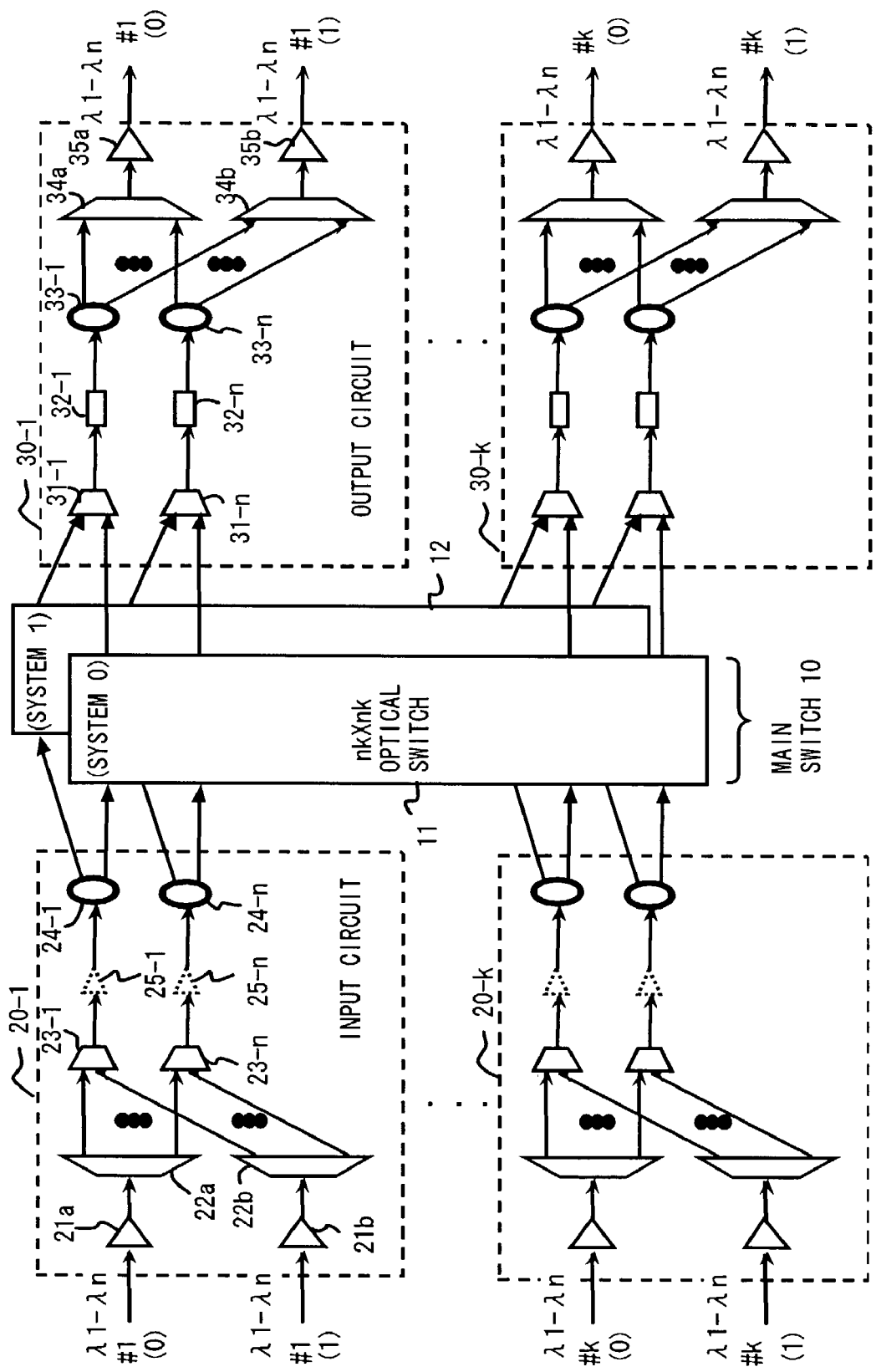
FIG. 5 shows a first embodiment of the optical cross-connect device.

FIG. 5 shows a first embodiment of the optical cross-connect device. This optical cross-connect device comprises a main switch unit 10, a plurality of input circuits 20-1 through 20-$k$ and a plurality of output circuits 30-1 through 30-$k$. Each of the input circuits 20-1 through 20-$k$ accommodates a duplicated input optical transmission line. Here, this duplicated input optical transmission line comprises one set of a system-0 line and a system-1 line that transmit identical WDM lights. Each of the output circuits 30-1 through 30-$k$ accommodates a duplicated output optical transmission line. Here, this duplicated output optical transmission line comprises one set of a system-0 line and a system-1 line that transmit identical WDM lights. There is no need to physically separate the input circuits 20-1 through 20-$k$. Similarly, there is also no need to physically separate the output circuits 30-1 through 30-$k$.

The main switch unit 10 comprises optical switches 11 and 12. Each of the optical switches 11 and 12 is an nk×nk switch with nk input ports and nk output ports, and it can guide an optical signal input from an arbitrary input port to an arbitrary output port. Here, "k" represents the number of input circuits 20-1 through 20-$k$ or the number of output circuits 30-1 through 30-$k$, and "n" represents the number of wavelengths multiplexed in the WDM light. Each of the optical switches 11 and 12 performs routing processes on optical signals demultiplexed for each wavelength. Furthermore, each of the optical switches 11 and 12 is controlled by the operating system shown in FIG. 4A or 4B. If this optical cross-connect device accommodates subscriber lines, this device may also comprise an input port corresponding to an add line and an output port corresponding to a drop line.

Each of the input circuits 20-1 through 20-$k$ basically has the same configuration. Specifically, each of the input circuits 20-1 through 20-$k$ comprises optical amplifiers 21$a$ and 21$b$, optical demultiplexers 22$a$ and 22$b$, optical selectors 23-1 through 23-$n$ and optical splitters 24-1 through 24-$n$. The optical amplifiers 21$a$ and 21$b$ amplify WDM light incoming from the system-0 line and the system-1 line, respectively. The optical demultiplexers 22$a$ and 22$b$ demultiplex the WDM light amplified by the optical amplifiers 21$a$ and 21$b$ for each wavelength, respectively.

Each of the optical selectors 23-1 through 23-$n$ selects an optical signal demultiplexed by the optical demultiplexers 22$a$ and 22$b$. Specifically, for example, an optical selector 23-1 selects either an optical signal with a wavelength $\lambda 1$ from the optical demultiplexer 22$a$ or an optical signal with a wavelength $\lambda 1$ from the optical demultiplexer 22$b$, and outputs the selected optical signal. An optical selector 23-$n$ selects either an optical signal with a wavelength $\lambda n$ from the optical demultiplexer 22$a$ or an optical signal with a wavelength $\lambda n$ from the optical demultiplexer 22$b$. In this case, each of the optical selectors 23-1 through 23-$n$ operates according to the instructions of the operating system. Each of the optical selectors 23-1 through 23-$n$ can be realized by a 2×1 switch.

Each of the optical splitters 24-1 through 24-$n$ splits the optical signal selected by the corresponding optical selectors 23-1 through 23-$n$, and inputs the split signals to both of the optical switches 11 and 12. Each of the optical splitters 24-1 through 24-$n$ can be realized by, for example, an optical coupler.

Each of the input circuits 20-1 through 20-$k$ may also further comprise optical amplifiers 25-1 through 25-$n$ amplifying optical signals for each wavelength, as requested. In this case, each of optical amplifiers 25-1 through 25-$n$ is, for example, a semiconductor optical amplifier (SOA).

Each of the output circuits 30-1 through 30-$k$ basically has the same configuration. Specifically, each of the output circuits 30-1 through 30-$k$ comprises optical selectors 31-1 through 31-$n$, wavelength converters 32-1 through 32-$n$, optical splitters 33-1 through 33-$n$, optical multiplexers 34$a$ and 34$b$, and optical amplifiers 35$a$ and 35$b$. Each of the output circuits 30-1 through 30-$k$ receives optical signals to be transmitted to a corresponding optical cross-connect device, from the main switch unit 10. Specifically, for example, the output circuit 30-1 receives optical signals to be transmitted to the optical cross-connect device (#1), from both of the optical switches 11 and 12. The output circuit 30-$k$ receives optical signals to be transmitted to the optical cross-connect device (#k), from both of the optical switches 11 and 12.

Each of the optical selectors 31-1 through 31-$n$ selects one of optical signals from the optical switches 11 and 12, and outputs the selected signal. Here, each of the optical selectors 31-1 through 31-$n$ operates according to the instructions from the operating system. Each of the optical selectors 31-1 through 31-$n$ is realized by, for example, a 2×1 switch.

Each of the wavelength converters 32-1 through 32-$n$ converts the wavelength of an optical signal selected by the corresponding optical selectors 31-1 through 31-$n$, into a prescribed wavelength. Specifically, for example, the wavelength converter 32-1 converts the wavelength of an optical signal selected by the optical selector 31-1 into a wavelength $\lambda 1$. The wavelength converter 32-$n$ converts the wavelength of an optical signal selected by the optical selector 31-$n$ into a wavelength $\lambda n$. Here, each of the wavelength converters 32-1 through 32-$n$ first converts a received optical signal into an electric signal, and converts the electric signal into an optical signal again. In this case, the 3R process (Re-timing, Re-shaping and Re-generating) can also be performed. Each of the wavelength converters 32-1 through 32-$n$ can be realized by, for example, a transponder.

Each of the optical splitters 33-1 through 33-$n$ splits an optical signal from the corresponding wavelength converters 32-1 through 32-$n$, and sends the split signals to both of the optical multiplexers 34$a$ and 34$b$. Thus, identical optical signals ($\lambda 1$ through $\lambda n$) are supplied to the optical multiplexers 34$a$ and 34$b$. Each of the optical splitters 33-1 through 33-$n$ can be realized by, for example, an optical coupler.

Each of the optical multiplexers 34$a$ and 34$b$ generates WDM light by multiplexing a plurality of the supplied optical signals ($\lambda 1$ through $\lambda n$). The optical amplifiers 35$a$ and 35$b$ amplify respective WDM light generated by the optical multiplexers 34$a$ and 34$b$, respectively. These WDM lights amplified by the optical amplifiers 35$a$ and 35$b$ are guided to the system-0 line and the system-1 line, respectively, and are transmitted to a corresponding optical cross-connect device.

Next, the operation of this optical cross-connect device is described with reference to FIGS. 6 and 7. In this example, an optical signal from the optical cross-connect device (#1) is routed to the optical cross-connect device (#4). It is assumed that the wavelength of this optical signal is $\lambda 1$.

Figure 6:
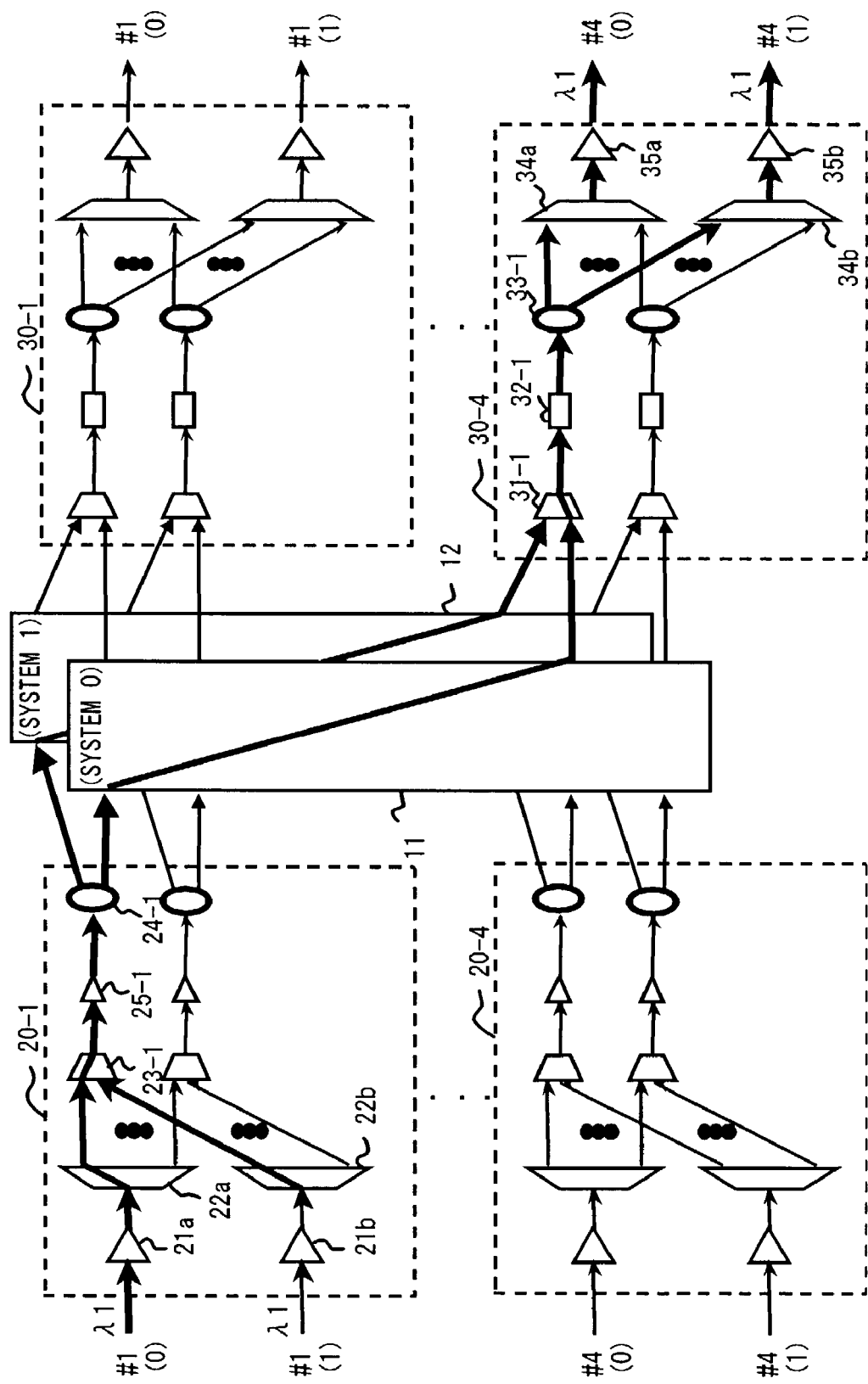
FIG. 6 shows the operation of the first embodiment of the optical cross-connect device (in normal conditions).

FIG. 6 shows the operation of the optical cross-connect device in a normal state. In FIG. 6, WDM light (including an optical signal with wavelength $\lambda 1$) from the optical cross-connect device (#1) is transmitted through the system-0 line and the system-1 line, and are received by the input circuit 20-1. Here, the WDM light transmitted through the system-0 line and the WDM light transmitted through the system-1 line are the same each other.

Each WDM light is demultiplexed for each wavelength by the optical demultiplexer 22a and 22b. Each of the optical demultiplexers 22a and 22b forwards the optical signal with wavelength λ1 to the optical selector 23-1. On receipt of optical signals from the optical demultiplexers 22a and 22b, the optical selector 23-1 selects either of the optical signals and outputs the selected signal. Here, it is assumed that the optical selector 23-1 selects an optical signal incoming through the system-0 line with higher priority. Then, the optical signal selected by the optical selector 23-1 is split by the optical splitter 24-1, and one and the other pieces of the split signals are input to the optical switches 11 and 12, respectively.

Thus, the input circuit 20-1 splits an optical signal incoming through the system-0 line or the system-1 line and inputs the split signals to the optical switches 11 and 12, respectively. Thus, identical optical signals are input to the optical switches 11 and 12. Each of the optical switches 11 and 12 forwards the optical signal to the output circuit 30-4.

In the output circuit 30-4, the one set of optical signals (λ1) are input to the optical selector 31-1. Then, the optical selector 31-1 selects one of the input optical signals. In this example, it is assumed that the optical selector 31-1 selects an optical signal from the switch 11 with higher priority. The wavelength converter 32-1 regenerates the optical signal selected by the optical selector 31-1. In this case, the wavelength of an optical signal to be regenerated by the wavelength converter 32-1 is λ1. Furthermore, the optical splitter 33-1 splits the optical signal regenerated by the wavelength converter 32-1 and supplies the split signals to the optical multiplexers 34a and 34b, respectively. Then, these optical signals are sent to the optical cross-connect device (#4) through the system-0 line and the system-1 line, together with optical signals with other wavelengths.

Thus, the output circuit 30-4 splits an optical signal from the optical switch 11 or 12, and forwards the split signals to the system-0 line and the system-1 line, respectively. Therefore, identical optical signals are transmitted through the system-0 line and the system-1 line.

Figure 7:
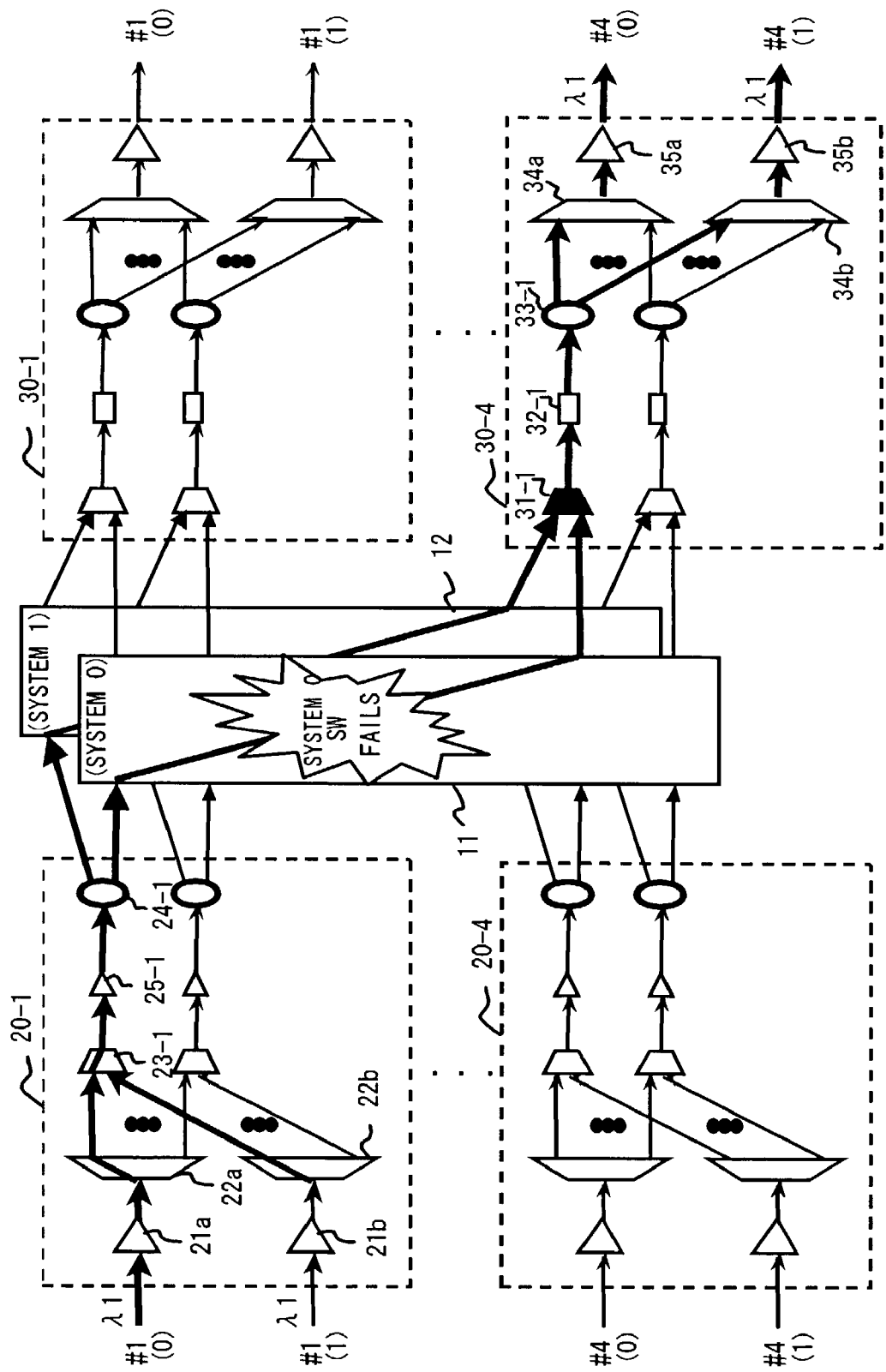
FIG. 7 shows the operation of the first embodiment of the optical cross-connect device (at the time of failure).

FIG. 7 shows the operation of the optical cross-connect device at the time of failure. In this example, it is assumed that the optical switch 11 fails.

In this case, the operation of the input circuit 20-1 is the same as that described above with reference to FIG. 6. Therefore, identical optical signals are input to the optical switches 11 and 12. If the optical switches 11 and 12 operate normally, as described above, one set of optical signals (λ1) is to be input to the output circuit 30-4. However, in this case, since the optical switch 11 fails, the optical selector 31-1 is supplied with optical signal only from the optical switch 12. Then, the optical selector 31-1 outputs the optical signal from the optical switch 12. The operation where an optical signal from the optical selector 31-1 is split and identical signals are guided to the system-0 line and the system-1 line has already been described above.

Thus, in the first embodiment of the optical cross-connect device, if the optical switch 11 or 12 fails, the device can recover from the failure by changing the respective states of the optical selectors 31-1 through 31-n provided for the output circuits 30-1 through 30-4.

A failure in the optical cross-connect device can be detected by the prior art. For example, as shown in FIG. 8, an optical splitter is provided in a path of optical signals, and a corresponding optical signal is split. Then, the optical level of the split optical signal is detected using an optical receiving element such as PD (Photo Diode), and the result of the detection is notified to the operating system. Then, the operating system detects whether there is a failure, by comparing the notified level with a prescribed threshold level. At this time, the operating system detects the defective optical device and gives prescribed instructions to corresponding optical device(s). In the example shown in FIG. 7, when the failure of the switch 11 is detected, instructions are given to an optical selector 31-1.

Figure 1:
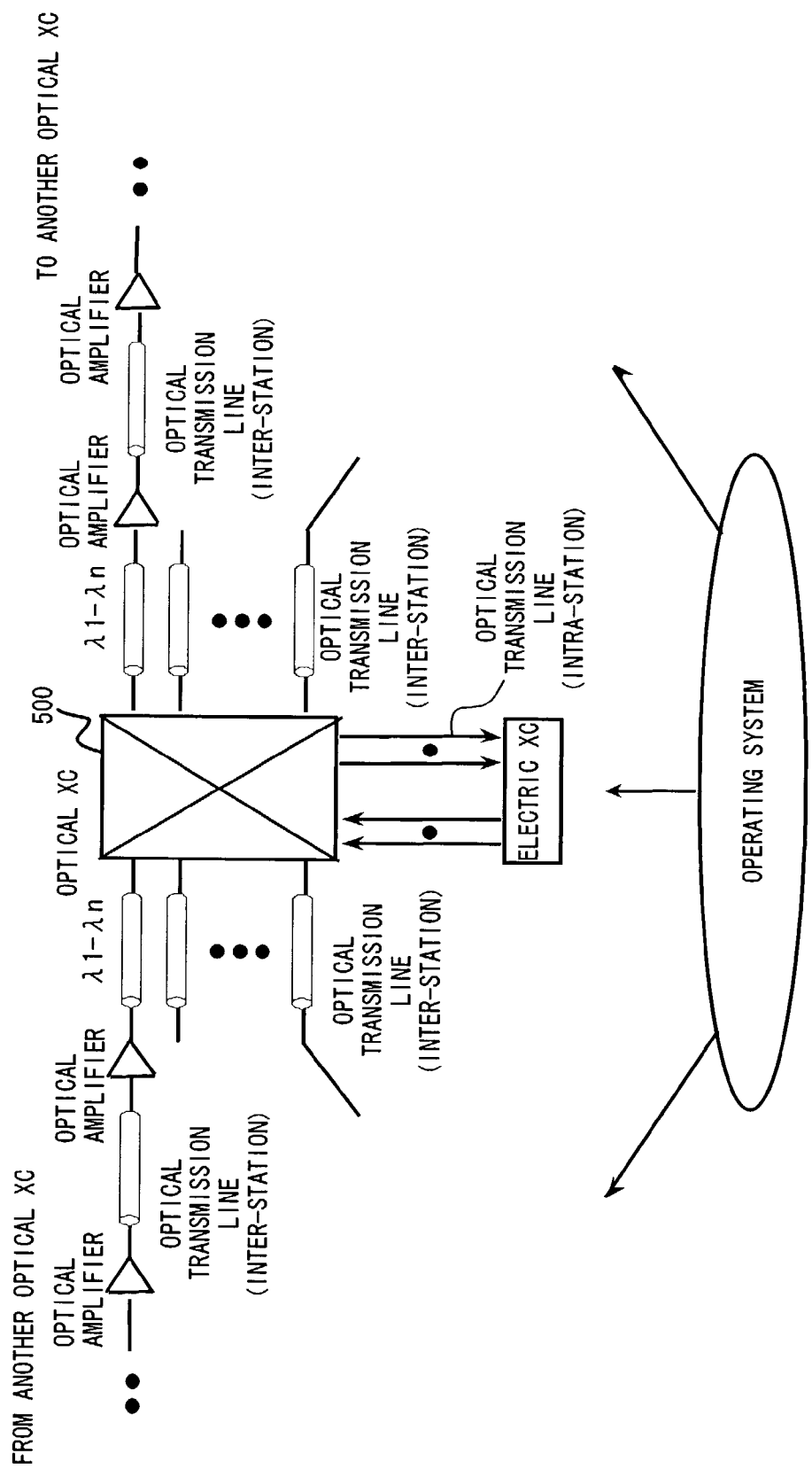
FIG. 1 shows the network environment in which an optical cross-connect device is used.
Figure 2:
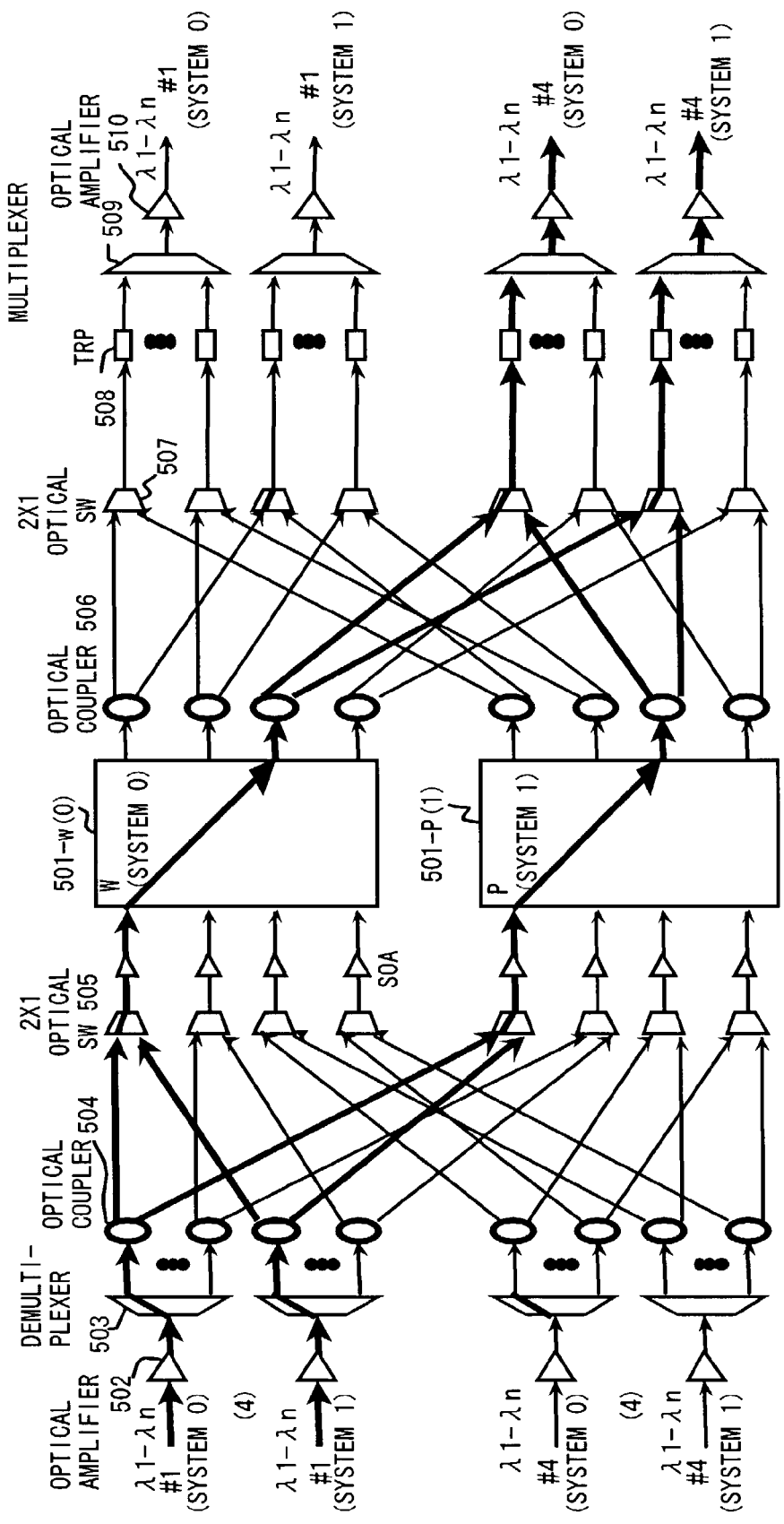
FIG. 2 shows the configuration of the existing optical cross-connect device.

Compared with the conventional optical cross-connect device shown in FIG. 2, in the optical cross-connect device of the first embodiment, the number of the wavelength converters 31-1 through 31-n (in FIG. 2, optical reproducer 508) is halved. Specifically, in the conventional optical cross-connect device shown in FIG. 2, the number of wavelength converters needed for each output circuit is "2n", while in the optical cross-connect device in the first embodiment, the number is "n". Therefore, the size of the optical cross-connect device in the first embodiment is smaller than that of the conventional optical cross-connect device, and cost is reduced. Furthermore, in the input circuit of the optical cross-connect device in the first embodiment too, the number of optical selectors and the number of the optical splitters are reduced compared with those of optical selectors and optical splitters of the conventional optical cross-connect device.

The Second Embodiment

Figure 9:
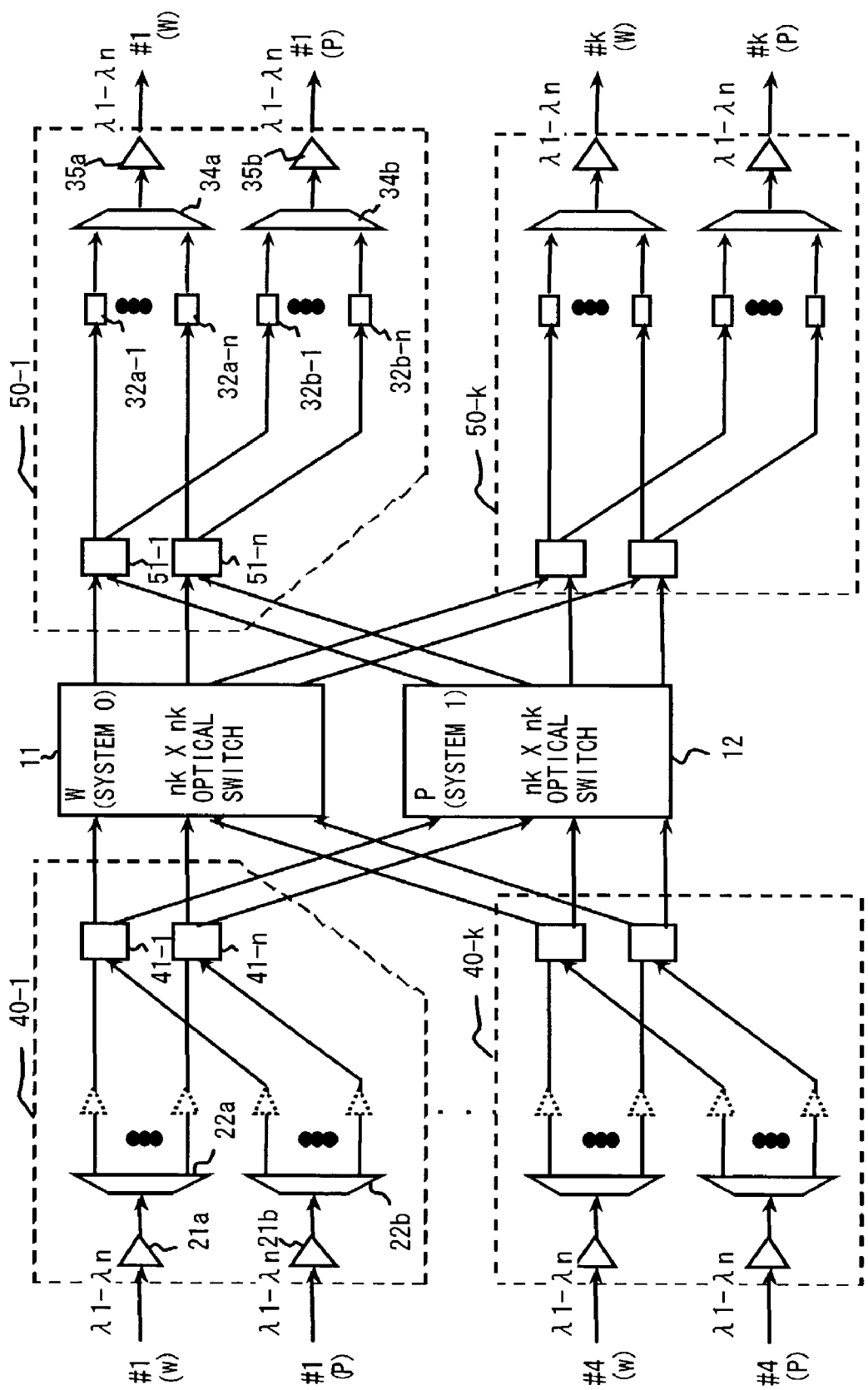
FIG. 9 shows a second embodiment of the optical cross-connect device.

FIG. 9 shows the optical cross-connect device in the second embodiment. This optical cross-connect device comprises optical switches 11 and 12, a plurality of input circuits 40-1 through 40-k and a plurality of output circuits 50-1 through 50-k. In this embodiment, each duplicated optical transmission line comprises one set of a working line W and a protection line P, each of which transmits different WDM light. The priority of a signal transmitted through the protection line P is lower than that of a signal transmitted through the working line W.

The optical switches 11 and 12 have already been described in the first embodiment. Therefore, their descriptions are omitted here.

Each of the input circuits 40-1 through 40-k comprises optical amplifiers 21a and 21b, optical demultiplexers 22a and 22b, and optical switches 41-1 through 41-k. The optical amplifiers 21a and 21b, and optical demultiplexers 22a and 22b have already been described in the first embodiment.

Each of the optical switches 41-1 through 41-n guides two respective optical signals demultiplexed for each wavelength by the optical demultiplexers 22a and 22b, to the optical switches 11 and 12, respectively. For example, the optical switch 41-1 guides an optical signal with wavelength λ1 from the optical demultiplexer 22a to one of the optical switches 11 and 12, and guides an optical signal with wavelength λ1 from the optical demultiplexer 22b to the other of the optical switches 11 and 12. The optical switch 41-n guides an optical signal with wavelength λn from the optical demultiplexer 22a to one of the optical switches 11 and 12, and guides an optical signal with wavelength λn from the optical demultiplexer 22b to the other of the optical switches 11 and 12. Here, each of the optical switches 41-1 through 41-n operates according to the instructions from the operating system. Each of the optical switches 41-1 through 41-n can be realized by, for example, a 2×2 switch.

Each of the output circuits 50-1 through 50-k comprises optical switches 51-1 through 51-n, wavelength converters 32a-1 through 32a-n and 32b-1 through 32b-n, optical multiplexers 34a and 34b, and optical amplifiers 35a and 35b. The optical multiplexers 34a and 34b, and the optical amplifiers 35a and 35b have already been described in the first embodiment. The wavelength converters 32a-1 through 32a-n and 32b-1 through 32b-n are the same as the wavelength converters 32-1 through 32-n described in the first embodiment. However, the wavelength converters 32a-1 through 32a-n are provided for converting the wavelengths of optical signals transmitted through the working line W, the wavelength converters 32b-1 through 32b-n are provided for converting the wavelengths of optical signals transmitted through the protection line P.

The optical switches 51-1 through 51-n guide respective optical signals from the optical switches 11 and 12 to the wavelength converters 32a-1 through 32a-n and 32b-1 through 32b-n. For example, the optical switch 51-1 guides an optical signal with wavelength $\lambda 1$ from the optical switch 11 to one of the wavelength converters 32a-1 and 32b-1, and guides an optical signal with wavelength $\lambda 1$ from the optical switch 12 to the other of the wavelength converters 32a-1 and 32b-1. The optical switch 51-n guides an optical signal with wavelength $\lambda n$ from the optical switch 11 to one of the wavelength converters 32a-n and 32b-n, and guides an optical signal with wavelength $\lambda n$ from the optical switch 12 to the other of the wavelength converters 32a-n and 32b-n. Here, each of the optical switches 51-1 through 51-n operates according to instructions from the operating system. Each of the optical switches 51-1 through 51-n can be realized by, for example, a 2×2 switch.

Next, the operation of the optical cross-connect device in the second embodiment is described with reference to FIGS. 10 and 11. In this example, as with the description of the first embodiment, an optical signal from an optical cross-connect device (#1) is routed to an optical cross-connect device (#4). It is assumed that the wavelength of this optical signal is $\lambda 1$.

Figure 10:
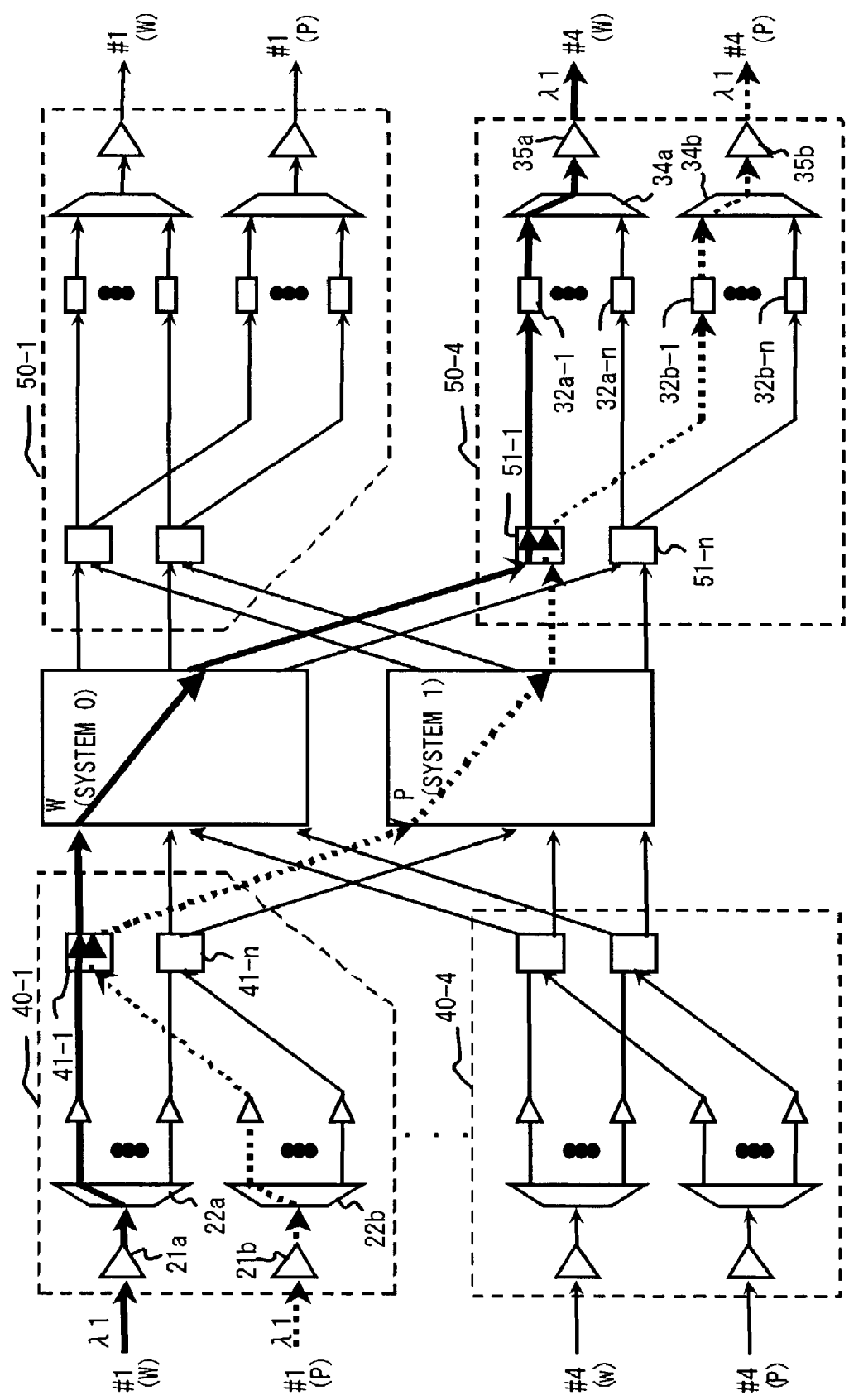
FIG. 10 shows the operation of the second embodiment of the optical cross-connect device (in normal conditions).

FIG. 10 shows the operation of the optical cross-connect device in the normal state. In FIG. 10, WDM light including an optical signal with wavelength $\lambda 1$ from the optical cross-connect device (#1) is transmitted through the working line W and the protection line P, and is received by the input circuit 40-1. The priority of a signal transmitted through the protection line P is lower than that of a signal transmitted through the working line W.

Each piece of WDM light is demultiplexed for each wavelength by the optical demultiplexers 22a and 22b. At this time, each of the optical demultiplexers 22a and 22b forwards the optical signal with wavelength $\lambda 1$ to an optical switch 41-1. Then, the optical switch 41-1 guides the optical signal from the optical demultiplexer 22a to the optical switch 11, and guides the optical signal from the optical demultiplexer 22b to the optical switch 12.

Thus, the input circuit 40-1 guides the optical signal from the working line W to the optical switch 11, and guides the optical signal from the protection line P to the optical switch 12. Specifically, in the normal state, an optical signal with high priority is input to the optical switch 11, and an optical signal with low priority is input to the optical switch 12. Then, each of the optical switches 11 and 12 guides the optical signal to the output circuit 50-4.

In the output circuit 50-4, the one set of optical signals ($\lambda 1$) are input to the optical switch 51-1. Then the optical switch 51-1 guides the optical signal from the optical switch 11 to the wavelength converter 32a-1, and guides the optical signal from the optical switch 12 to the wavelength converter 32b-1. The wavelength converters 32a-1 and 32b-1 regenerate the optical signals from the optical switch 51-1.

In this case, the wavelength of the regenerated optical signal is "$\lambda 1$". Then, the optical signal regenerated by the wavelength converter 32a-1 is transmitted to the optical cross-connect device (#4) through the working line W together with optical signals with other wavelengths. On the other hand, the optical signal regenerated by the wavelength converter 32b-1 is transmitted to the optical cross-connect device (#4) through the protection line P together with optical signals with other wavelengths.

Thus, the output circuit 50-4 guides optical signals from the optical switch 11 to the working line W, and simultaneously guides optical signals from the optical switch 12 to the protection line P.

Figure 11:
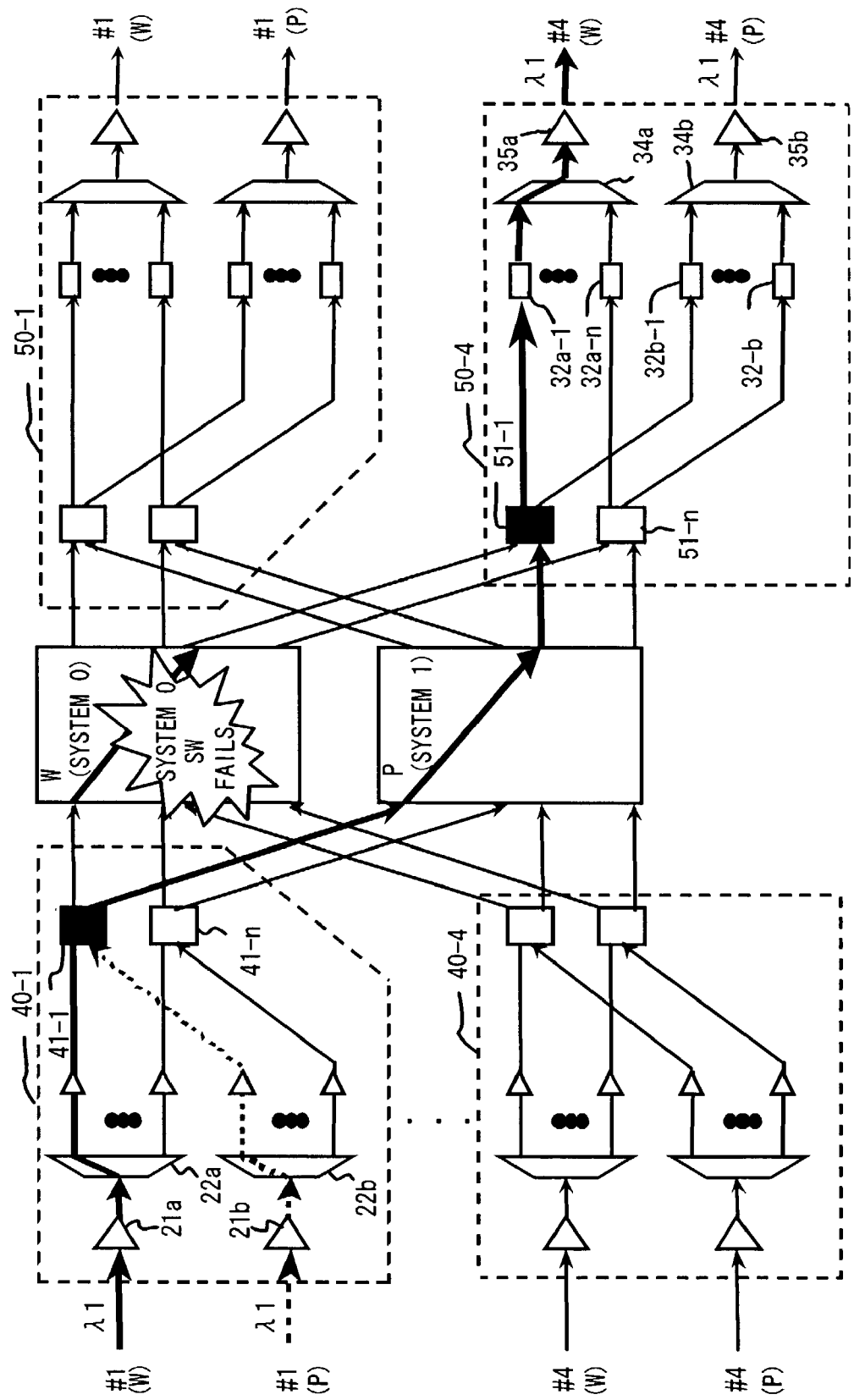
FIG. 11 shows the operation of the second embodiment of the optical cross-connect device (at the time of failure).

FIG. 11 shows the operation of the optical cross-connect device at the time of failure. In this example, it is assumed that the optical switch 11 fails.

In this case, in the input circuit 40-1, the optical switch 41-1 guides an optical signal from the working line W to the optical switch 12, and guides an optical signal from the protection line P to the optical switch 11. In this case, the optical switch 12 guides the optical signal from the optical switch 41-1 to the optical switch 51-1 of the output circuit 50-4. Then, the optical switch 51-1 guides the optical signal from the optical switch 12 to the wavelength converter 32a-1. The operation where an optical signal regenerated by the wavelength converter 32a-1 is output to the working line W has been already described above.

As described above, in the optical cross-connect device of the second embodiment, if a switch for an optical signal with high priority (in this case, optical switch 11) fails, the optical signal is routed by another switch (in this case, optical switch 12). Thus, the device can recover from the failure.

Compared with the conventional optical cross-connect device shown in FIG. 2, in the optical cross-connect device of the second embodiment, no optical splitter is provided in the path forwarding from an input port to an output port. Here, when an optical signal is split into 1 to 1 using an optical splitter, the power of the optical signal drops by 3 dB. Therefore, the optical loss caused in the optical cross-connect device in the second embodiment is reduced.

The Third Embodiment

Figure 12:
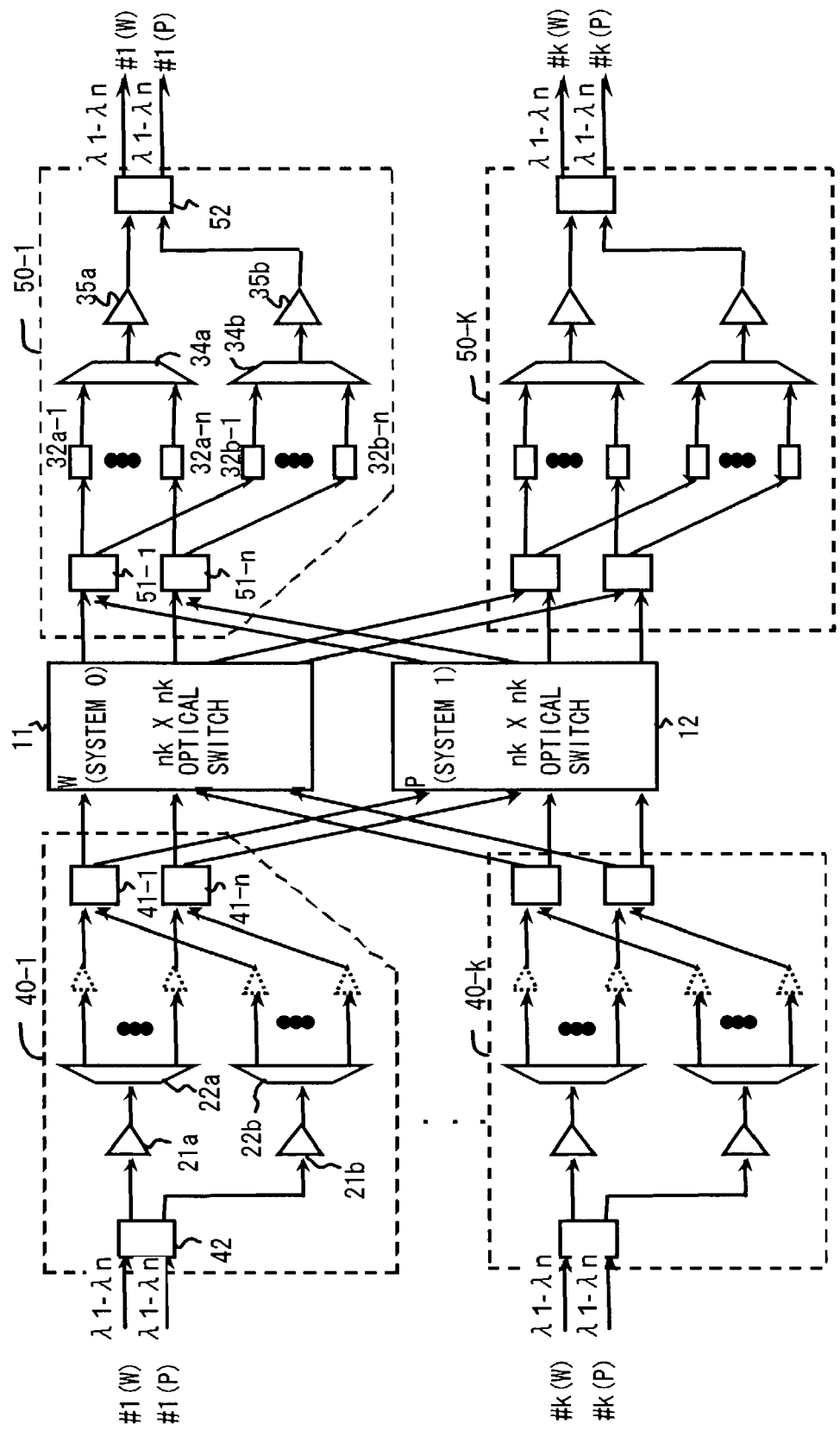
FIG. 12 shows a third embodiment of the optical cross-connect device.

FIG. 12 shows the optical cross-connect device in the third embodiment. The optical cross-connect device in the third embodiment can be realized by adding a function to switch over transmission lines, to the optical cross-connect device in the second embodiment.

Specifically, each of input circuits 40-1 through 40-k comprises an optical switch 42 in addition to the optical amplifiers 21a and 21b, optical demultiplexers 22a and 22b, and optical switches 41-1 through 41-n that have been described above. The optical switch 42 accommodates the working line W and protection line P, and guides two pieces of WDM light input from those lines to the optical amplifiers 21a and 21b, respectively. The operation of the optical switch 42 is controlled by the operating system. The optical switch 42 can be realized by, for example, a 2×2 switch.

Each of the output circuits 50-1 through 50-k comprises an optical switch 52 in addition to the optical switches 51-1 through 51-n, wavelength converters 32a-1 through 32a-n and 32b-1 through 32b-n, optical multiplexers 34a and 34b, and optical amplifiers 35a and 35b that have been described above. The optical switch 52 guides two pieces of WDM light amplified by the optical amplifiers 35a and 35b to the working line W and the protection line P, respectively. The operation of the optical switch 52 is controlled by the operating system. The switch 52 can be realized by, for example, a 2×2 switch.

Next, the operation of the optical cross-connect device in the third embodiment is described with reference to FIGS. 13 and 14. It is assumed that the signals to be transmitted are the same as those described in the second embodiment.

Figure 13:
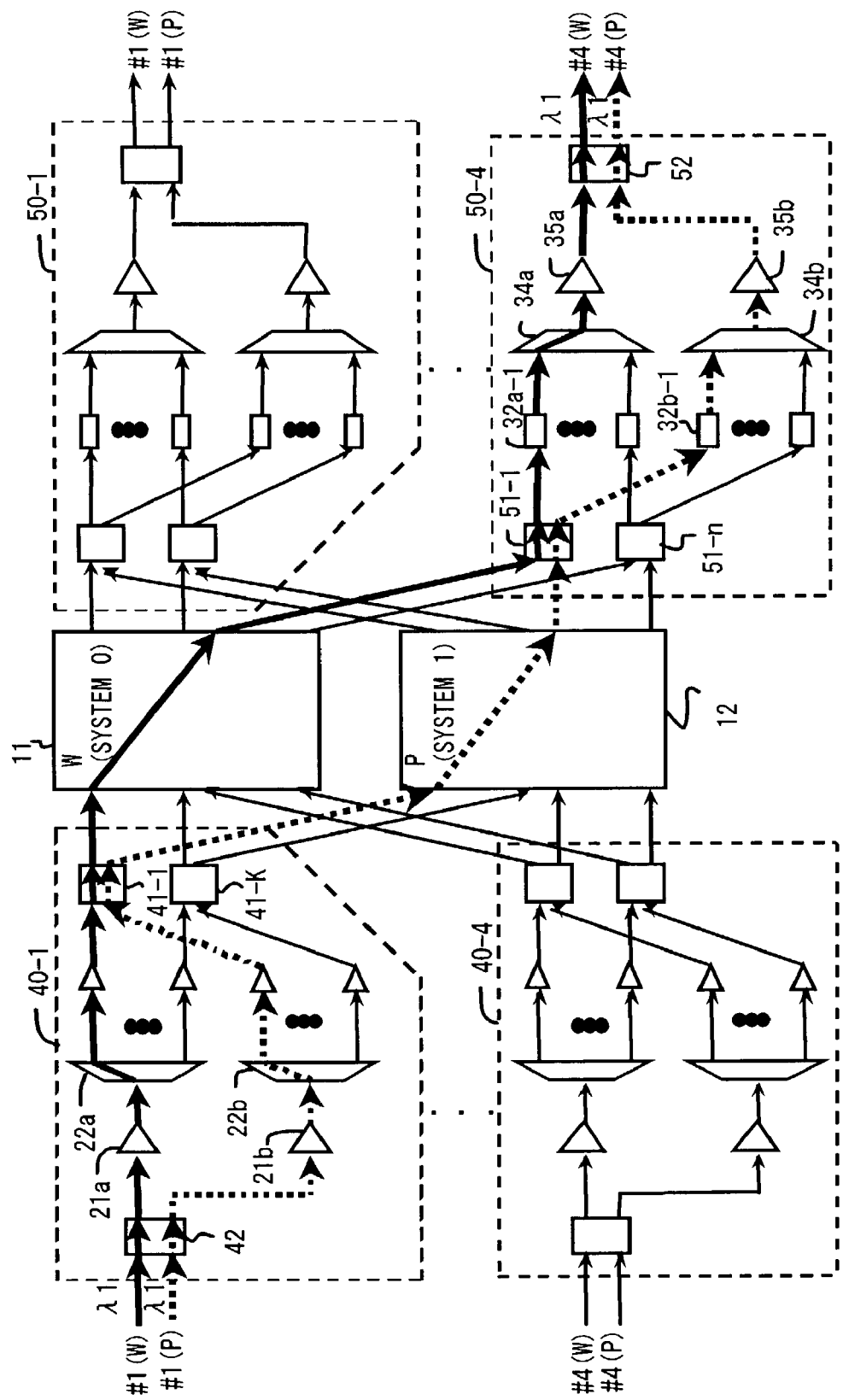
FIG. 13 shows the operation of the third embodiment of the optical cross-connect device (in normal conditions).

FIG. 13 shows the operation of the optical cross-connect device in a normal state. In the normal state, the optical switch 42 guides the WDM light from the working line W to the optical amplifier 21a, and guides the WDM light from the protection line P to the optical amplifier 21b. In this case, two pieces of WDM light received from the working line W and the protection line P are input to the optical amplifiers 21a and 21b, respectively. Therefore, the operation in the route from the optical amplifiers 21a and 21b of the input circuit 40-1 to the optical amplifiers 35a and 35b of the output circuit 50-4 is the same as that in the second embodiment shown in FIG. 10. Specifically, an optical signal with wavelength λ1 included in the WDM light from the working line W is transmitted through the optical demultiplexer 22a, optical switch 41-1, optical switch 11, optical switch 51-1, wavelength converter 32a-1 and optical multiplexer 34a, then amplified by the optical amplifier 35a together with optical signals with other wavelengths. On the other hand, an optical signal with wavelength λ1 included in the WDM light from the protection line P is transmitted through the optical demultiplexer 22b, optical switch 41-1, optical switch 12, optical switch 51-1, wavelength converter 32b-1 and optical multiplexer 34b, then amplified by the optical amplifier 35b together with optical signals with other wavelengths. Then, the optical switch 52 guides the WDM light amplified by the optical amplifier 35a to the working line W, and guides the WDM light amplified by the optical amplifier 35b to the protection line P.

Thus, the normal operation of this optical cross-connect device is basically the same as that described in the second embodiment.

FIG. 14 shows the operation at the time of failure. If in the optical cross-connect device of the third embodiment, the optical switch 11 fails, the optical switch 42 is switched over from a "bar state" to a "cross state", and the optical switch 52 is switched over from a "bar state" to a "cross state". However, each of the other optical devices (optical switches 41-1 through 41-n, optical switches 11 and 12, and optical switches 51-1 through 51-n) holds the same normal state.

In this case, since the optical switch 42 is already switched over from the "bar state" to the "cross state", WDM light from the working line W is guided to the optical amplifier 21b. Each of the optical switches 41-1 through 41-n, optical switches 11 and 12, and optical switches 51-1 through 51-n holds the same normal state. Therefore, an optical signal with wavelength λ1 included in the WDM light from the working line W is transmitted through the optical switch 41-1, optical switch 12, optical switch 51-1, wavelength converter 32b-1 and optical multiplexer 34b, and then amplified by the optical amplifier 35b together with optical signals with other wavelengths. In addition, since the optical switch 52 is also already switched over from the "bar state" to the "cross state", the WDM light amplified by the optical amplifier 35b is guided to the working line W.

Thus, in the optical cross-connect device of the third embodiment, if the optical switch 11 fails, the device can recover from the failure by simply switching over the states of optical switches 42 and 52.

The Fourth Embodiment

FIG. 15 shows the optical cross-connect device in the fourth embodiment. The optical cross-connect device in the fourth embodiment has a function to automatically recover from a failure when an optical device corresponding to an arbitrary wavelength included in WDM light fails. In other words, in the optical cross-connect device of the fourth embodiment, a line interface unit is redundantly configured. FIG. 15 shows only one of a duplicated optical transmission line which connects two optical cross-connect devices. In addition, FIG. 15 shows only one optical switch of the duplicated main switch.

The optical cross-connect device in the fourth embodiment comprises an optical switch 13, input circuits 60-1 through 60-k and output circuits 70-1 through 70-k. The optical switch 13 is an (nk+k)×(nk+k) switch.

Each of the input circuits 60-1 through 60-k comprises an optical splitter 61, an optical amplifier 62, an optical demultiplexer 63, a wavelength selector 64 and an optical amplifier 65. The optical splitter 61 splits input WDM light. The splitting ratio of the optical splitter 61 is not limited, and it is represented by "n:1". The optical splitter 61 can be realized by, for example, an optical coupler. The optical amplifier 62 amplifies WDM light supplied through the optical splitter 61. Then, the optical demultiplexer 63 demultiplexes the WDM light amplified by the optical amplifier 62 for each wavelength and inputs the demultiplexed optical signals to the optical switch 13.

The wavelength selector 64 selects and outputs an optical signal with a wavelength designated by the operating system from a plurality of optical signals included in the WDM light. Then, the optical amplifier 65 amplifies the optical signal selected by the wavelength selector 64 and inputs the signal to the optical switch 13. Here, if a specific optical power is obtained, the optical amplifier 65 is not needed.

When, in the input circuit described above, an arbitrary optical signal λx of a plurality of optical signals λ1 through λn is not input due to some failure, the wavelength selector 64 selects an optical signal with wavelength λx from the WDM light and outputs the selected signal. Thus, the device can recover from a failure that occurs in the input circuit.

Each of the output circuits 70-1 through 70-k comprises fixed wavelength converters 71-1 through 71-n, an optical multiplexer 72, an optical amplifier 73, a variable wavelength converter 74, an optical amplifier 75 and an optical coupler 76. Each of the fixed wavelength converters 71-1 through 71-n converts the wavelength of an optical signal from the optical switch 13 into a corresponding wavelength, respectively. For example, the fixed wavelength converter 71-1 converts the wavelength of the supplied optical signal into λ1, and the fixed wavelength converter 71-n converts the wavelength of the supplied optical signal into λn. At this time, each optical signal is regenerated by each of the fixed wavelength converters 71-1 through 71-n. The optical multiplexer 72 generates WDM light by multiplexing optical signals regenerated by the fixed wavelength converters 71-1 through 71-n. Then, the optical amplifier 73 amplifies the WDM light generated by the optical multiplexer 72.

The variable wavelength converter 74 converts the wavelength of a supplied optical signal into a wavelength designated by the operating system. At this time, this optical signal is regenerated by this variable wavelength converter 74. Then, the optical amplifier 75 amplifies the optical signal regenerated by the variable wavelength converter 74. Here, if a specific optical power is obtained, the optical amplifier 75 is not needed. Furthermore, the optical coupler 76 combines the WDM light amplified by the optical amplifier 73 with the optical signal regenerated by the variable wavelength converter 74.

In the output circuit described above, if an arbitrary optical signal λx of a plurality of optical signals cannot be output due to some failure, the optical switch 13 guides corresponding optical signal to the variable wavelength converter 74. Then, the variable wavelength converter 74 converts the wavelength of the optical signal into λx and outputs the signal. Thus, the device can recover from the failure that occurs in an output circuit.

Thus, the optical cross-connect device in the preferred embodiment can recover from a failure relating to an arbitrary wavelength without duplicating the fixed wavelength converters 71-1 through 71-n. For example, if the number of the wavelengths of WDM light is "32", according to the present invention, the recovery function described above can be realized by 32 fixed wavelength converters and one variable wavelength converter. However, according to the prior art, 64 (=32×2) fixed wavelength converters are needed.

The Fifth Embodiment

FIG. 16 shows the optical cross-connect device in the fifth embodiment. The basic configuration of the optical cross-connect device in the fifth embodiment is the same as that of the optical cross-connect device in the fourth embodiment shown in FIG. 15. However, in the input circuit of the cross-connect device of the fifth embodiment, input WDM light is split by the optical splitter 61 after being amplified by the optical amplifier 62. Therefore, the optical amplifier 65 is not needed. In an output circuit, WDM light generated by the optical multiplexer 72 is combined with the optical signal regenerated by the variable wavelength converter 74 before being amplified by the optical amplifier 73. Therefore, the optical amplifier 75 is not needed.

The Configurations of the Sixth through Eleventh Embodiments

The sixth through eleventh embodiments are described below with reference to FIGS. 17 through 22. Each of the optical cross-connect devices in the sixth through eleventh embodiments can be realized by selectively combining the first through fifth embodiments. However, the main switch unit 10 of the optical cross-connect devices in the sixth through eleventh embodiments comprises one set of (nk+k)×(nk+K) switches 13 and 14. Although FIGS. 17 through 22 show only one input circuit and one output circuit, in reality, the device comprises k input circuits and k output circuits.

Figure 17:
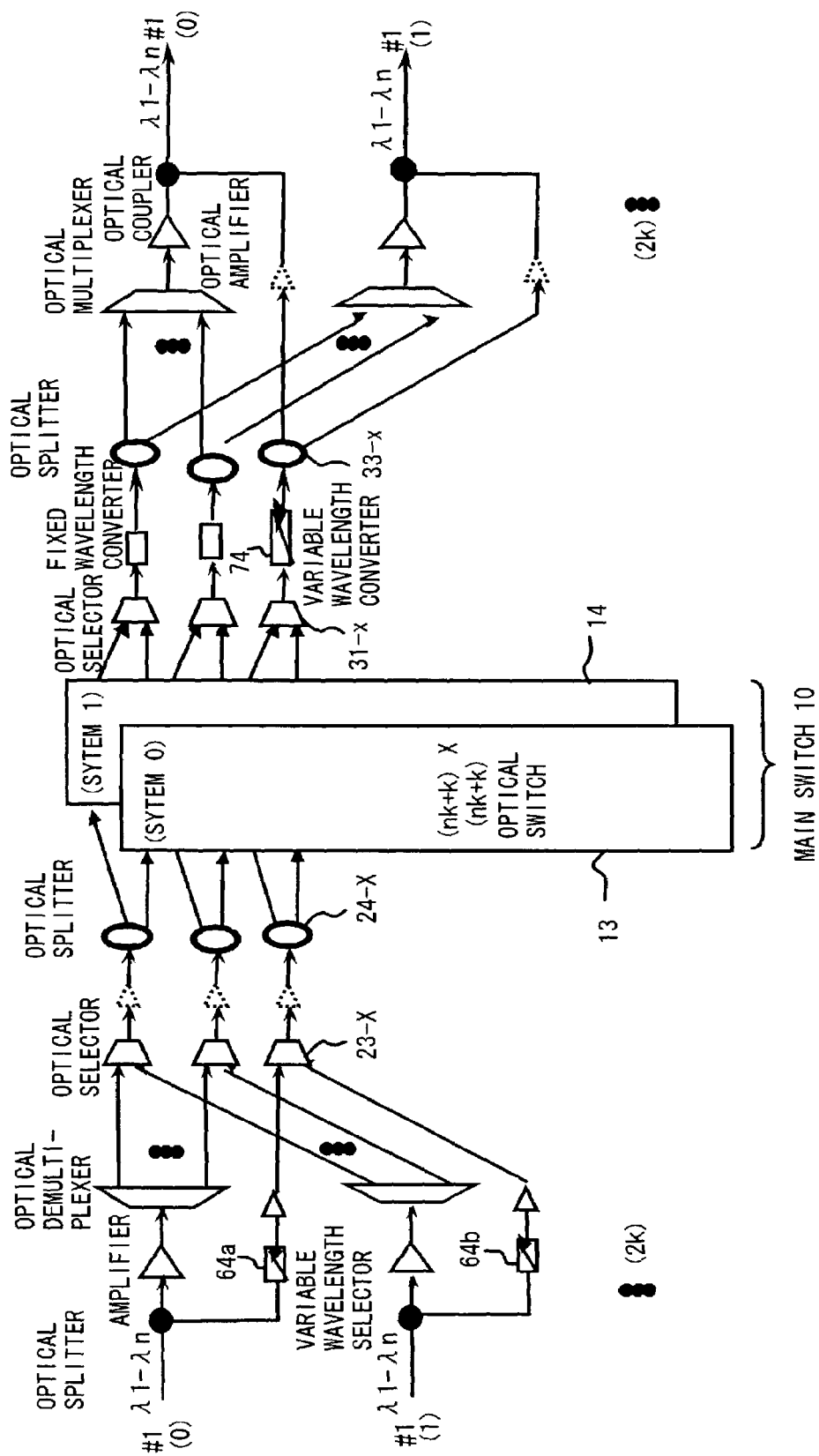
FIG. 17 shows a sixth embodiment of the optical cross-connect device.

FIG. 17 shows the optical cross-connect device in the sixth embodiment. The optical cross-connect device in the sixth embodiment can be basically realized by combining the optical cross-connect device in the first embodiment shown in FIG. 5 with the optical cross-connect device in the fourth embodiment shown in FIG. 15.

Figure 18:
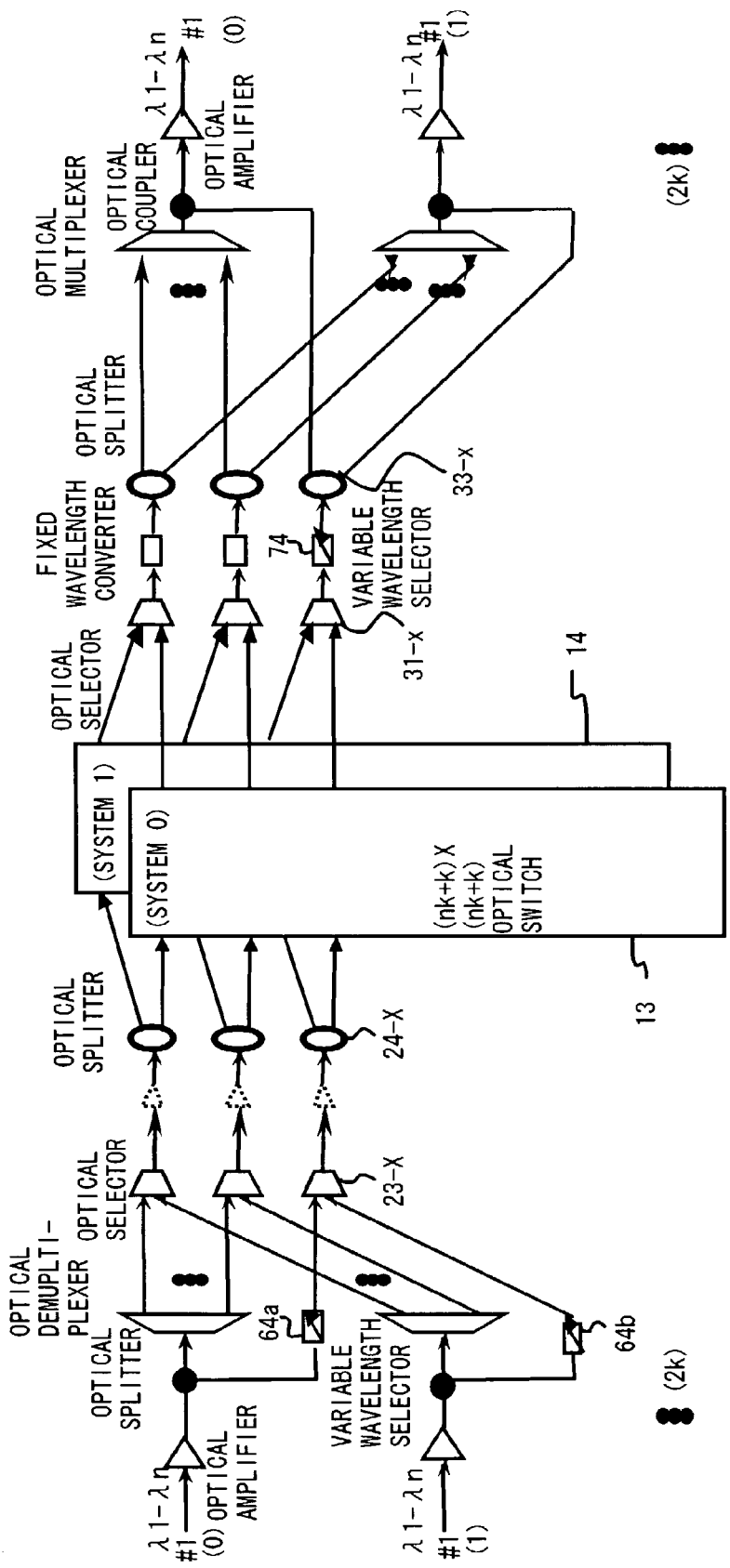
FIG. 18 shows a seventh embodiment of the optical cross-connect device.

FIG. 18 shows the optical cross-connect device in the seventh embodiment. The optical cross-connect device in the seventh embodiment can be basically realized by combining the optical cross-connect device in the first embodiment shown in FIG. 5 with the optical cross-connect device in the fifth embodiment shown in FIG. 16.

In each of the optical cross-connects in the sixth and seventh embodiments, identical WDM signals are transmitted through the system-0 line and the system-1 line. A wavelength selector 64a selects an optical signal with a wavelength designated by the operating system from the WDM light received through the system-0 line, and outputs the selected signal. A wavelength selector 64b selects an optical signal with a wavelength designated by the operating system from the WDM light received through the system-1 line, and outputs the selected signal. Furthermore, an optical selector 23-x guides the optical signal selected by the wavelength selectors 64a or 64b to an optical splitter 24-x. Then, the optical splitter 24-x splits the optical signal selected by the optical selector 23-x and inputs the two branched signals to optical switches 13 and 14, respectively.

In the output circuit, an optical selector 31-x selects one of optical signals from the optical switches 13 and 14. The variable wavelength converter 74 converts the wavelength of the optical signal selected by the optical selector 31-x into a wavelength designated by the operating system. At this time, the optical signal is regenerated by the variable wavelength converter 74. The optical signal regenerated by the variable wavelength converter 74 is split by an optical splitter 33-x, and then each of the split optical signals is combined with WDM light to be output to the system-0 line and WDM light to be output to the system-1 line, respectively.

Thus, the optical cross-connect device in the sixth and seventh embodiments can recover from the failure of the main switch or a line failure of an arbitrary wavelength without duplicating the fixed wavelength converter.

Figure 19:
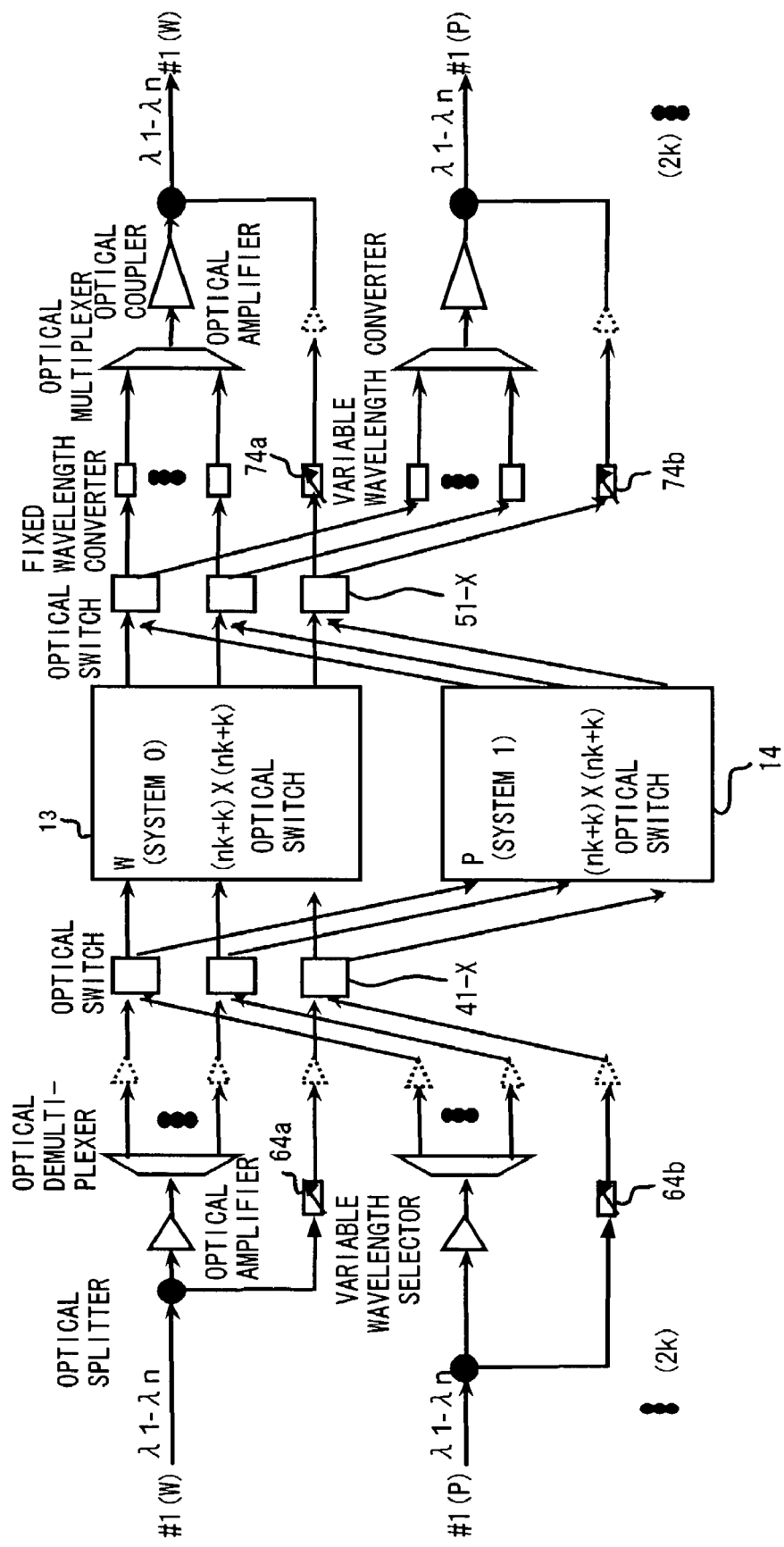
FIG. 19 shows an eighth embodiment of the optical cross-connect device.

FIG. 19 shows the optical cross-connect device in the eighth embodiment. The optical cross-connect device in the eighth embodiment can be basically realized by combining the optical cross-connect device in the second embodiment shown in FIG. 9 with the optical cross-connect device in the fourth embodiment shown in FIG. 15.

FIG. 20 shows the optical cross-connect device in the ninth embodiment. The optical cross-connect device in the ninth embodiment can be basically realized by combining the optical cross-connect device in the second embodiment shown in FIG. 9 with the optical cross-connect device in the fifth embodiment shown in FIG. 16.

In each of the optical cross-connect devices in the eighth and ninth embodiments, different WDM signals are transmitted through the working line W and the protection line P. Then, the wavelength selector 64a selects an optical signal with a wavelength designated by the operating system from WDM light received through the working line W, and outputs the selected signal. The wavelength selector 64b selects an optical signal with a wavelength designated by the operating system from WDM light received through the protection line P, and outputs the selected signal. Then, an optical switch 41-x guides one of the optical signals selected by the wavelength selectors 64 and 64b to the optical switch 13, and guides the other signal to the optical switch 14.

In the output circuit, an optical switch 51-x guides one of the optical signals from the optical switches 13 and 14 to the variable wavelength converter 74a, and guides the other signal to the variable wavelength converter 74b. Each of the variable wavelength converters 74a and 74b converts the wavelength of the optical signal from the optical switch 51-x into a wavelength designated by the operating system, respectively. Then, these optical signals are combined with WDM light to be transmitted through the working line W and WDM light to be transmitted through the protection line P, respectively.

Thus, the optical cross-connect device in the eighth and ninth embodiments can recover from the failure of the main switch or a line failure of an arbitrary wavelength without duplicating the fixed wavelength converter.

Figure 21:
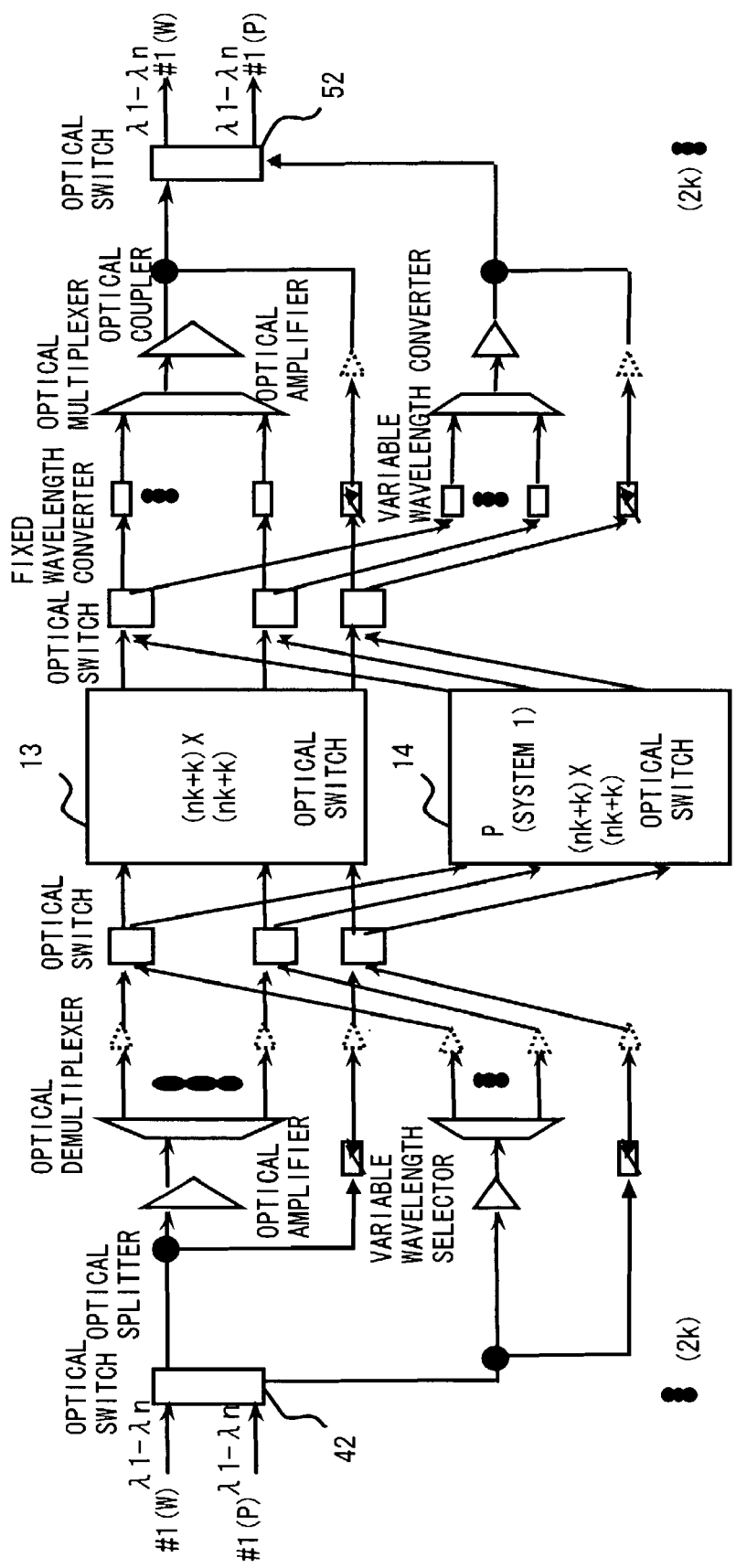
FIG. 21 shows a tenth embodiment of the optical cross-connect device.

FIG. 21 shows the optical cross-connect device in the tenth embodiment. The optical cross-connect device, in the tenth embodiment can be basically realized by combining the optical cross-connect device in the third embodiment shown in FIG. 12 with the optical cross-connect device in the fourth embodiment shown in FIG. 15. In other words, the optical cross-connect device in the tenth embodiment can be realized by adding optical switches 42 and 52 to the optical cross-connect device in the eighth embodiment shown in FIG. 19.

Figure 22:
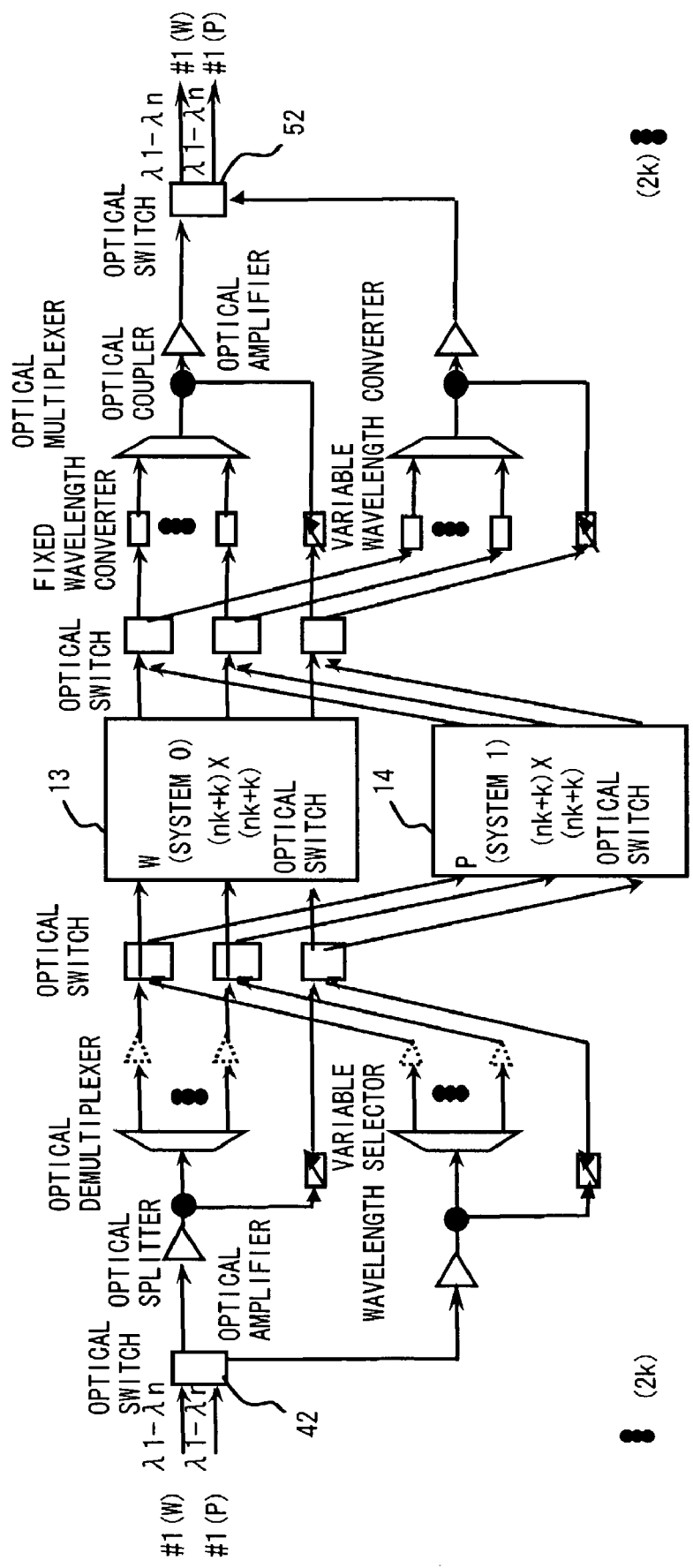
FIG. 22 shows an eleventh embodiment of the optical cross-connect device.

FIG. 22 shows the optical cross-connect device in the eleventh embodiment. The optical cross-connect device in the eleventh embodiment can be basically realized by combining the optical cross-connect device in the third embodiment shown in FIG. 12 with the optical cross-connect device in the fifth embodiment shown in FIG. 16. The optical cross-connect device in the eleventh embodiment can be basically realized by adding optical switches 42 and 52 to the optical cross-connect device in the ninth embodiment shown in FIG. 20.

The Operations of the Sixth through Eleventh Embodiments

The operations of the optical cross-connect device in the sixth through eleventh embodiments will be described. In the following description, an optical signal from the optical cross-connect device (#1) is routed to the optical cross-connect device (#4). In addition, it is assumed that the wavelength of this optical signal is λ1.

Figure 23:
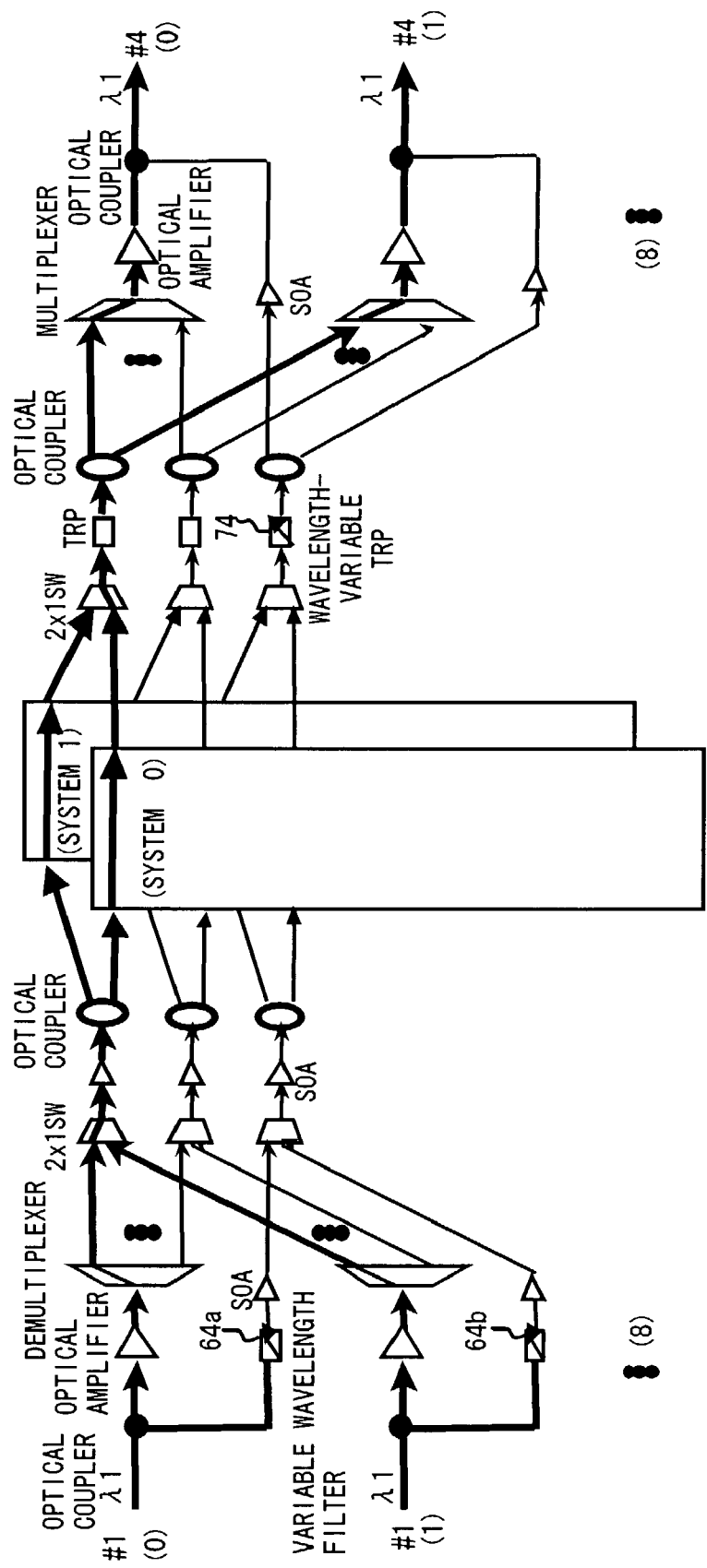
FIG. 23 shows the operation of the sixth embodiment of the optical cross-connect device (in normal conditions).
Figure 24:
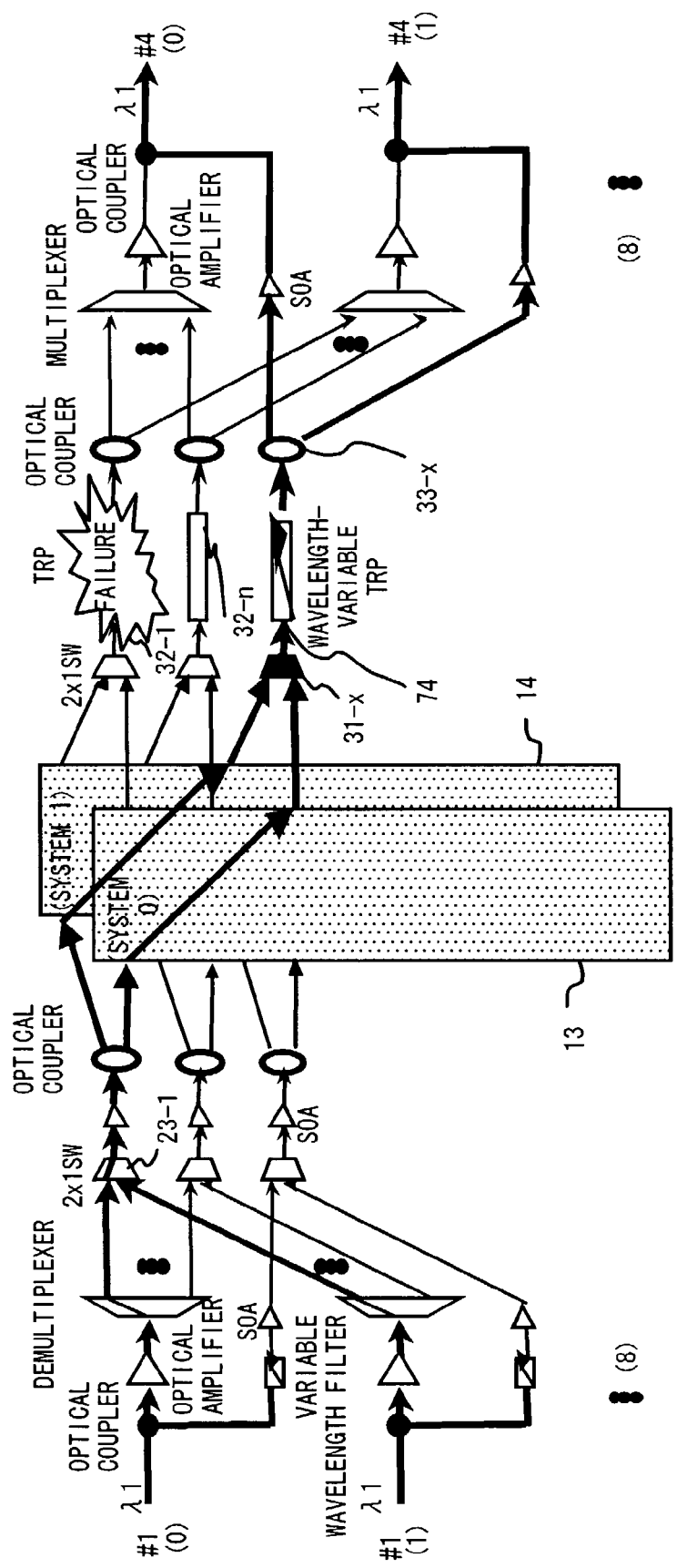
FIG. 24 shows the operation of the sixth embodiment of the optical cross-connect device (at the time of failure; Part 1).
Figure 25:
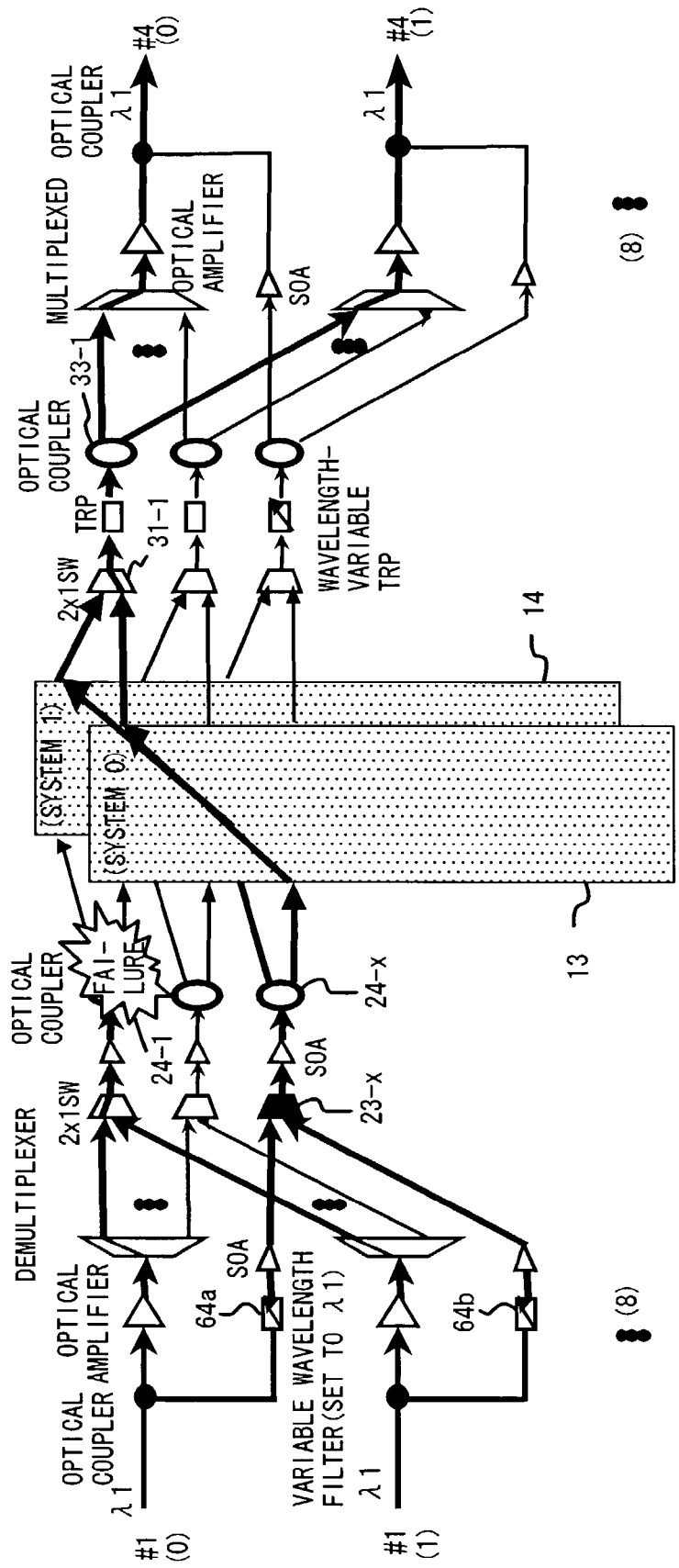
FIG. 25 shows the operation of the sixth embodiment of the optical cross-connect device (at the time of failure; Part 2).

FIGS. 23 through 25 show the operation of the optical cross-connect device in each of the sixth and seventh embodiments. Although in this example, the operation of the optical cross-connect device in the sixth embodiment is described, the same description also applies to that of the seventh embodiment.

FIG. 23 shows the normal operation of the optical cross-connect device. In FIG. 23, WDM light (including an optical signal with wavelength λ1) sent from the optical cross-connect device (#1) is transmitted through the system-0 line and the system-1 line. In this case, identical WDM lights are transmitted through the system-0 line and the system-1 line.

In a normal state, the wavelength selectors (variable wavelength filters) 64a and 64b do not output optical signals. Furthermore, in this case, no optical light is input to the variable wavelength converter (wavelength variable TRP) 74. Therefore, in this case, the operation of the optical cross-connect device in the sixth embodiment is the same as that of the optical cross-connect device in the first embodiment shown in FIG. 6.

FIG. 24 shows the operation of the optical cross-connect device when an arbitrary fixed wavelength converter in the output circuit fails. In this example, it is assumed that a fixed wavelength converter (TRP) 32-1, which converts the wavelength of an optical signal to be output into λ1, fails.

In this case, the optical switches 13 and 14, the optical selector 31-x and the variable wavelength converter 74 operate as follows according to instructions from the operating system. Specifically, each of the optical switches 13 and 14 guides an optical signal selected by an optical selector 23-1 to the optical selector 31-x. The optical selector 31-x selects the optical signal from the optical switch 13. Furthermore, the variable wavelength converter 74 converts the wavelength of the optical signal selected by the optical selector 31-x into λ1. Then, the optical signal output from the variable wavelength converter 74 is split by the optical splitter 33-x, and the two branched signals are combined with WDM light to be output to the system-0 line and WDM light to be output to the system-1 line, respectively.

Thus, when a wavelength converter generating an optical signal with wavelength λ1 fails, the variable wavelength converter 74 operates in such a way as to generate an optical signal with wavelength λ1. As a result, the device can recover from the failure.

FIG. 25 shows the operation at the time when an optical device corresponding to an arbitrary wavelength in the input circuit fails. In this example, it is assumed that an optical splitter (optical coupler) 24-1, which splits an optical signal with wavelength λ1, fails.

In this case, the wavelength selectors (variable wavelength filters) 64a and 64b, the optical selector 23-x and the optical switches 13 and 14 operate as follows according to instructions from the operating system. Specifically, each of the wavelength selectors 64a and 64b selects an optical signal with wavelength λ1 from input WDM light. Then, the optical selector 23-x selects an optical signal from the wavelength selector 64a. In this case, the optical signal selected by the optical selector 23-x is split by the optical splitter 24-x and two branched signals are input to the optical switches 13 and 14, respectively. Furthermore, each of the switches 13 and 14 guides the optical signal selected by the optical selector 23-x to the optical selector 31-1. Then, this optical signal is split by the optical splitter (optical coupler) 33-1, and two branched signals are combined with WDM light to be output through the system-0 line and WDM light to be output through the system-1 line, respectively.

Thus, when an optical device of a wavelength λ1 fails in the input circuit, each of the wavelength selectors 64a and 64b operate in such a way as to select an optical signal with a wavelength λ1. Thus, the device can recover from the failure.

Figure 26:
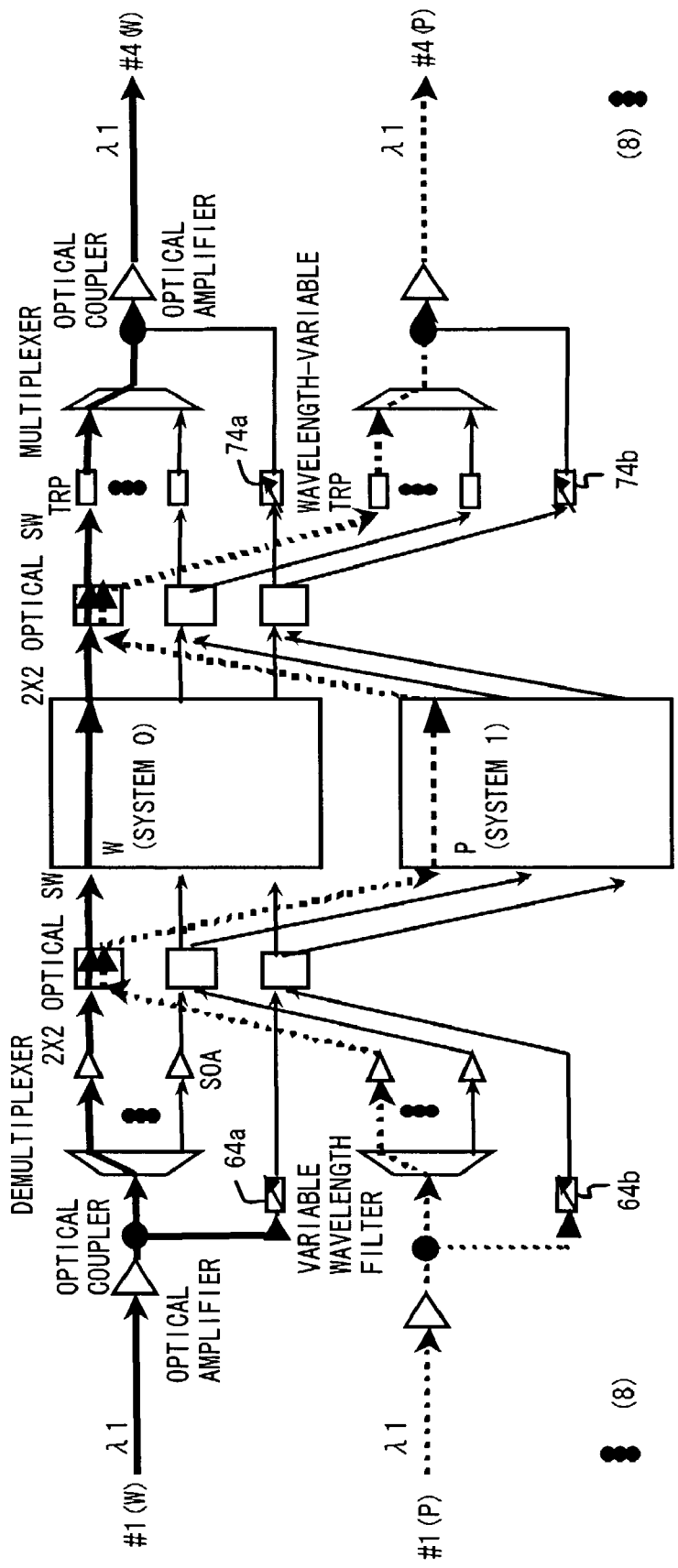
FIG. 26 shows the operation of the ninth embodiment of the optical cross-connect device (in normal conditions).
Figure 27:
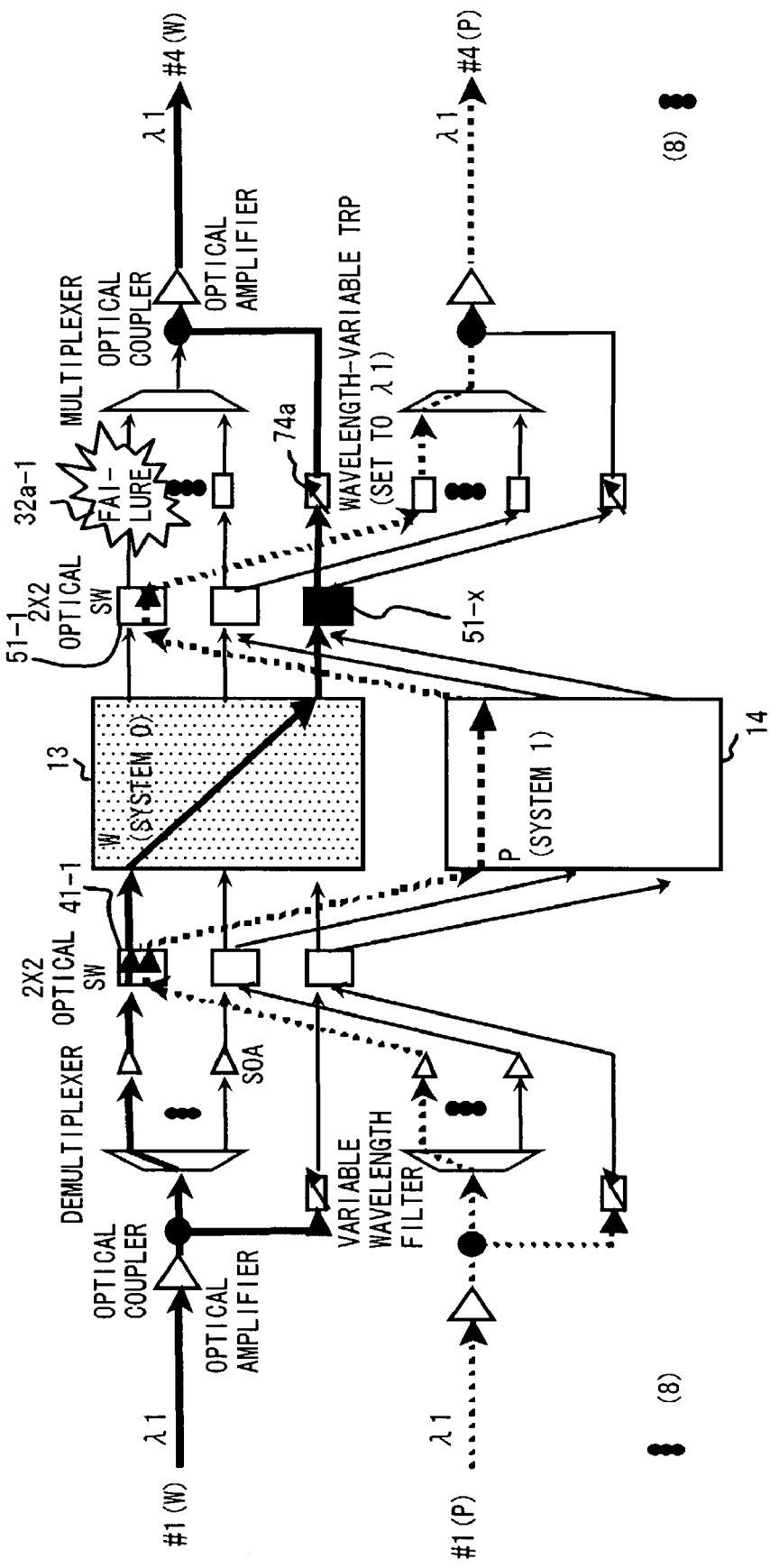
FIG. 27 shows the operation of the ninth embodiment of the optical cross-connect device (at the time of failure; Part 1).
Figure 28:
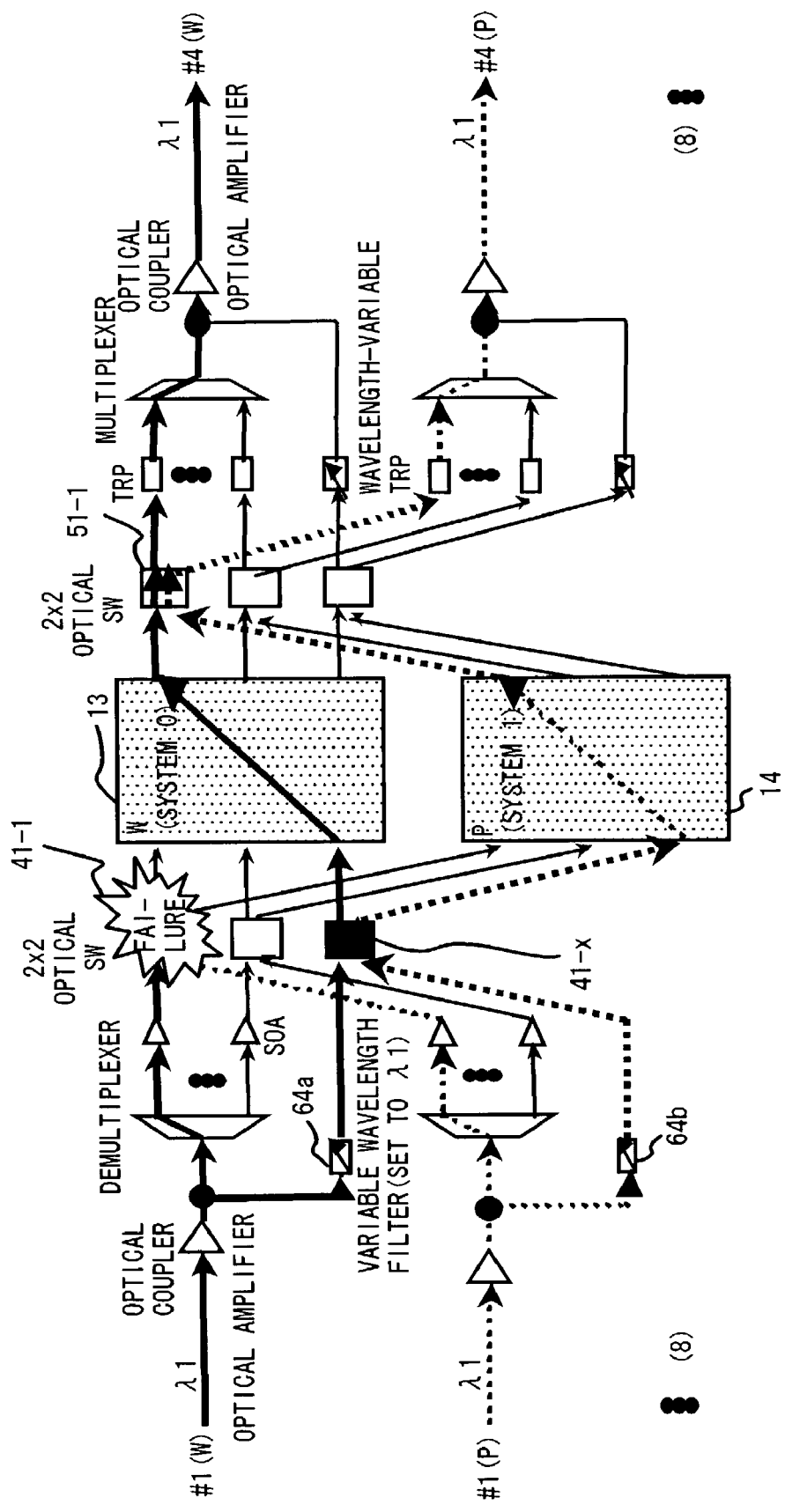
FIG. 28 shows the operation of the ninth embodiment of the optical cross-connect device (at the time of failure; Part 2).

FIGS. 26 through 28 show the operations of the optical cross-connect devices in the eighth and ninth embodiments. Although in this example, the operation of the optical cross-connect device in the ninth embodiment is described, the same description also applies to that of the optical cross-connect device in the eighth embodiment.

FIG. 26 shows the normal operation of the optical cross-connect device. In FIG. 26, WDM light (including an optical signal with wavelength λ1) sent from the optical cross-connect device (#1) is transmitted through the working line W and the protection line P. The priority of a signal transmitted through the working line W is higher than that transmitted through the protection line P.

In a normal state, the wavelength selectors (variable wavelength filters) 64a and 64b do not output optical signals. In addition, no optical signals are supplied to the variable wavelength converter (wavelength variable TRP) 74a and 74b. Therefore, in this case, the operation of the optical cross-connect device in the ninth embodiment is the same as that of the optical cross-connect device in the second embodiment shown in FIG. 10.

FIG. 27 shows the operation of the optical cross-connect device at the time when an arbitrary fixed wavelength converter in the output circuit fails. In this example, it is assumed that a fixed wavelength converter (TRP) 32a-1, which converts the wavelength of an optical signal to be output into λ1, fails.

In this case, the optical switch 13, the optical switch 51-x and the variable wavelength converter 74a operate as follows according to instructions from the operating system. Specifically, the optical switch 13 guides an optical signal from the optical switch 41-1 to the optical switch 51-x. The optical switch 51-x guides the optical signal from the optical switch 13 to the variable wavelength converter 74a. The variable wavelength converter 74a converts the wavelength of the optical signal from the optical switch 51-x into λ1. Then, the optical signal output from the variable wavelength converter 74a is coupled with WDM light to be output through the working line W. The optical signal received through the protection line P is guided to the protection line P on the output side through the same route as that in the normal operation.

Thus, when a wavelength converter generating an optical signal with wavelength λ1 fails, the variable wavelength converter 74a operates in such a way as to generate an optical signal with wavelength λ1. Thus, the device can recover from the failure.

FIG. 28 shows the operation of the optical cross-connect device at the time when an optical device corresponding to an arbitrary wavelength in the input circuit fails. In this example, it is assumed that an optical switch 41-1 provided for an optical signal with wavelength λ1 fails.

In this case, the wavelength selectors (variable wavelength filters) 64a and 64b, the optical switch 41-x and the optical switches 13 and 14 operate as follows according to instructions from the operating system. Specifically, each of the wavelength selectors 64a and 64b selects an optical signal with wavelength λ1 from input WDM light. The optical switch 41-x guides the optical signal from the wavelength selectors 64a to the optical switch 13, and guides the optical signal from the wavelength selectors 64b to the optical switch 14. Each of the switches 13 and 14 guides the optical signal from the optical switch 41-x to the optical switch 51-1. Then, these optical signals are guided to the working line W and the protection line P, respectively.

Thus, when an optical device corresponding to wavelength λ1 in the input circuit fails, the wavelength selectors 64a and 64b operate in such a way as to select an optical signal with wavelength λ1. Thus, the device can recover from the failure.

Figure 29:
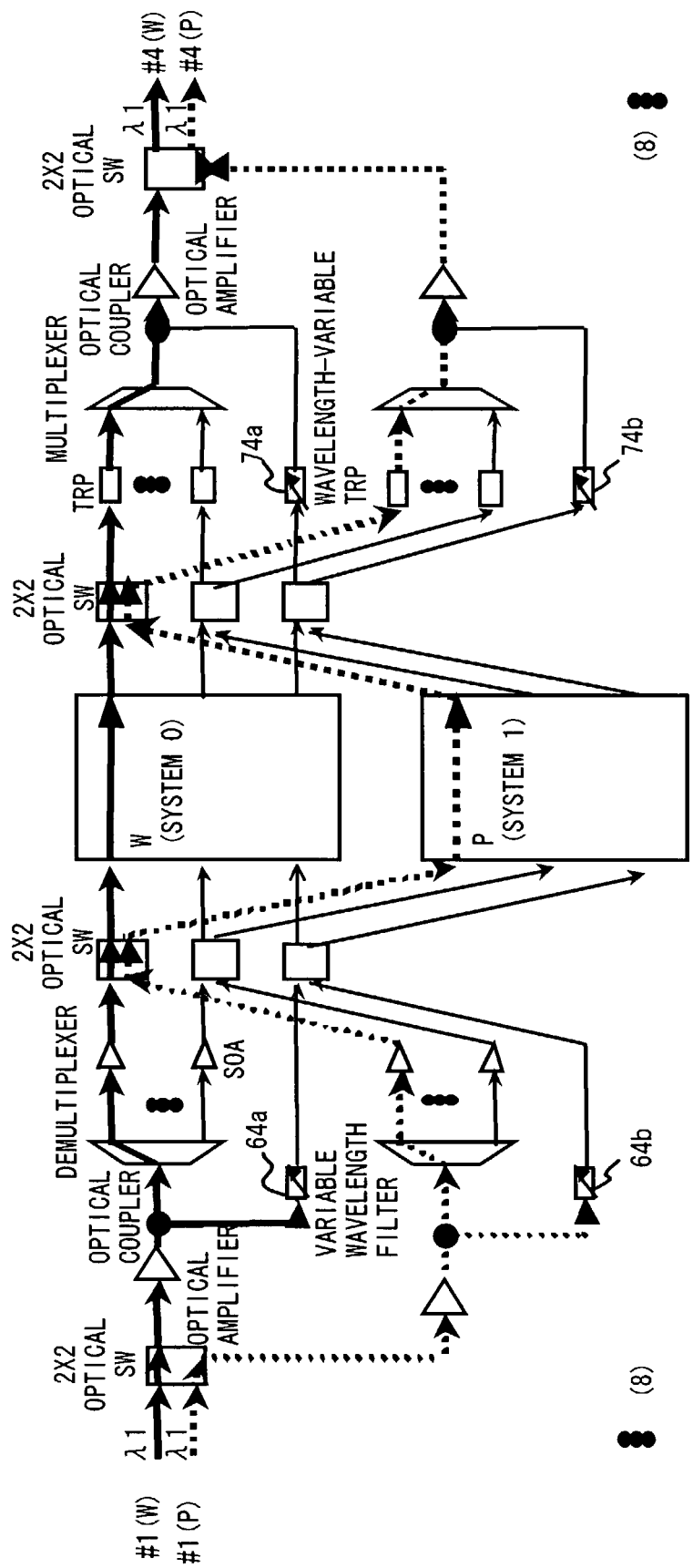
FIG. 29 shows the operation of the eleventh embodiment of the optical cross-connect device (in normal conditions).
Figure 30:
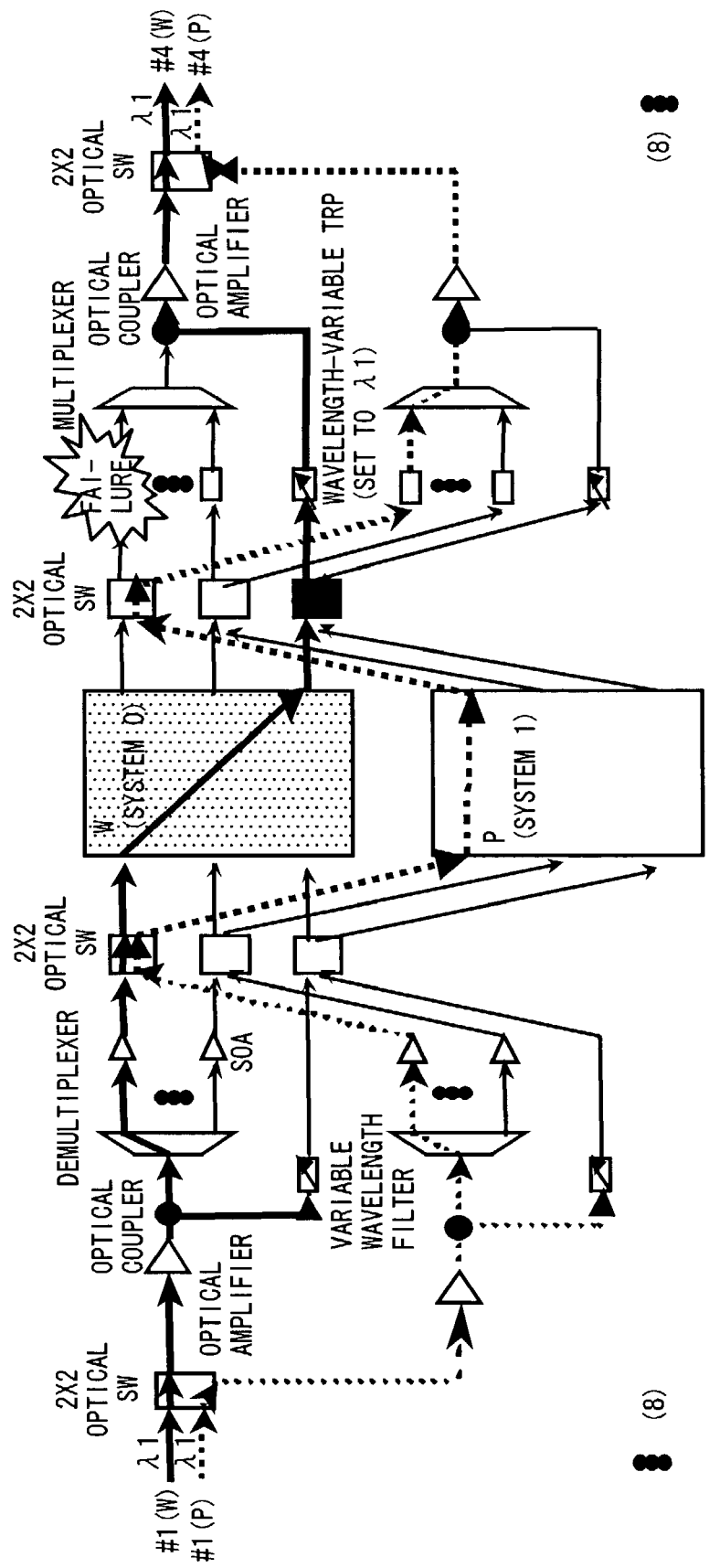
FIG. 30 shows the operation of the eleventh embodiment of the optical cross-connect device (at the time of failure; Part 1).
Figure 31:
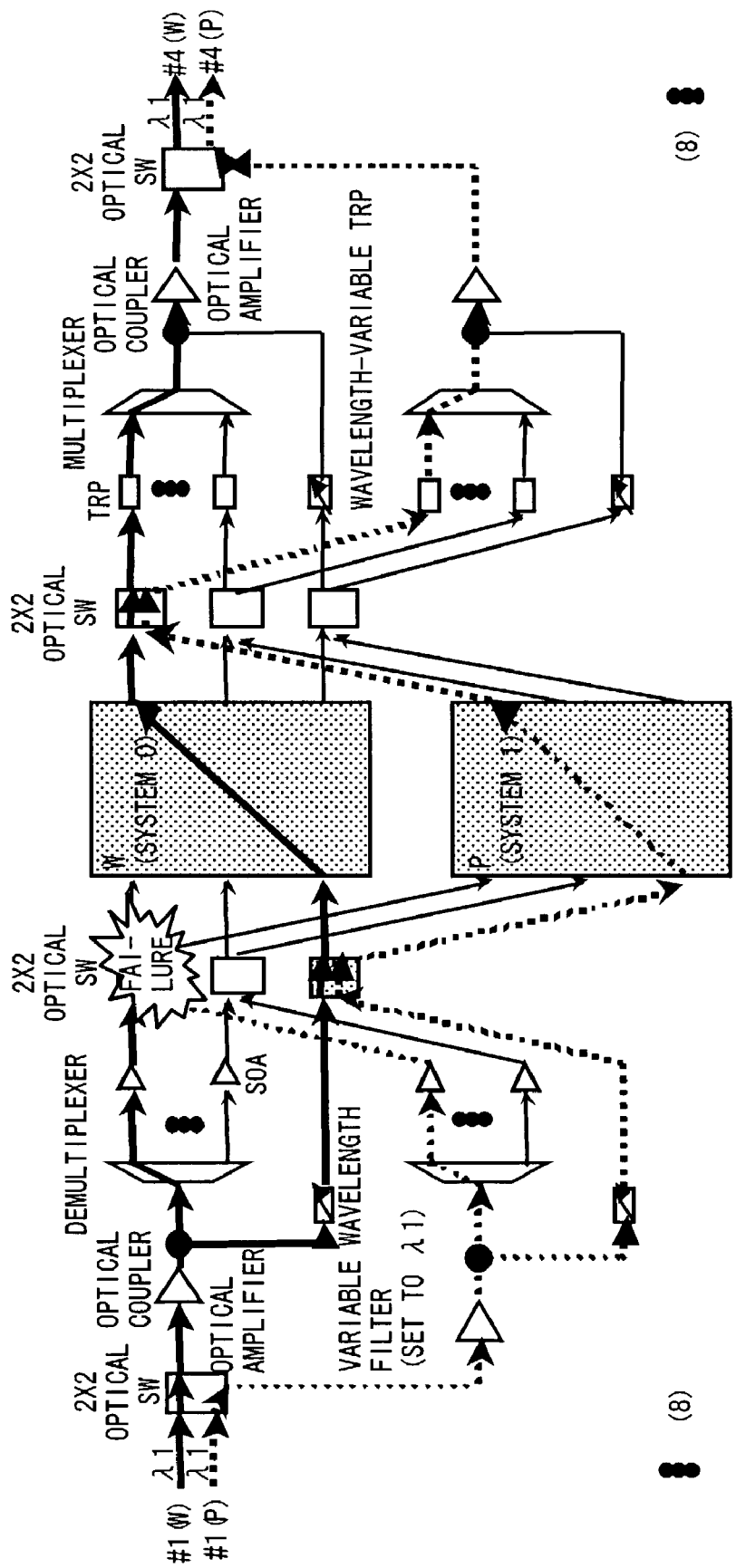
FIG. 31 shows the operation of the eleventh embodiment of the optical cross-connect device (at the time of failure; Part 2).

FIGS. 29 through 31 show the operations of the optical cross-connect devices in the tenth and eleventh embodiments. Although in this example, the operation of the optical cross-connect device in the eleventh embodiment is described, the same description also applies to that of the optical cross-connect device in the tenth embodiment.

FIG. 29 shows the normal operation of the device. In a normal state, the wavelength selectors (variable wavelength filters) 64a and 64b do not output optical signals. In addition, no optical signals are supplied to the variable wavelength converter (wavelength variable TRP) 74a and 74b. Therefore, in this case, the operation of the optical cross-connect device in the eleventh embodiment is the same as that of the optical cross-connect device in the third embodiment shown in FIG. 13.

FIG. 30 shows the operation of the optical cross-connect device at the time when an arbitrary fixed wavelength converter in the output circuit fails. In this example, it is assumed that a fixed wavelength converter (TRP) 32a-1, which converts the wavelength of an optical signal to be output into λ1, fails. Since the recovery operation in this case is the same as that shown in FIG. 27, the description is omitted.

FIG. 31 shows the operation of the optical cross-connect device at the time when an optical device corresponding to an arbitrary wavelength in the input circuit fails. In this example, it is assumed that an optical switch 41-1 splitting an optical signal with wavelength λ1 fails. Since the recovery operation in this case is the same as that shown in FIG. 28, the description is omitted.

According to the present invention, if identical signals are transmitted through a duplicated optical transmission line connecting two optical cross-connect devices, the number of wavelength converters or optical regenerators is halved. Therefore, the miniaturization of each optical cross-connect device can be realized.

Since optical loss in the optical cross-connect device is suppressed, the demand for an optical amplifier can also be mitigated.

Furthermore, a system recovering from the failure of an optical device corresponding to an arbitrary wavelength in WDM light can be simplified.

What is claimed is:

1. An optical cross-connect device accommodating a plurality of sets of duplicated input transmission lines and a plurality of sets of duplicated output transmission lines, comprising:
   a first main switch;
   a second main switch;
   a plurality of input circuits provided for corresponding duplicated input transmission line; and
   a plurality of output circuits provided for corresponding duplicated output transmission line, wherein
   each of said input circuits further comprising:
      a first demultiplexer for demultiplexing WDM light received from a first input transmission line in a corresponding duplicated input transmission line for each wavelength;
      a second demultiplexer for demultiplexing WDM light received from a second input transmission line in the corresponding duplicated input transmission line for each wavelength;
      a plurality of first selectors, provided for each input wavelength, each of said plurality of first selectors selecting either an optical signal from said first demultiplexer or an optical signal from said second demultiplexer; and
      a plurality of optical first splitters, each of said plurality of optical first splitters splitting an optical signal selected by corresponding first selectors and guiding the split signals to said first main switch and said second main switch, respectively, and wherein
   each of said output circuits further comprising:
      a plurality of second selectors, each of said plurality of second selectors selecting either an optical signal from said first main switch or an optical signal from said second main switch;
      a plurality of regenerators, each of said plurality of regenerators regenerating an optical signal with a respective output wavelength based on an optical signal selected by corresponding second selector;
      a first multiplexer for multiplexing a plurality of optical signals and guiding the multiplexed signal to a first output transmission line in a corresponding duplicated output transmission line;
      a second multiplexer for multiplexing a plurality of optical signals and guiding the multiplexed signal to a second output transmission line in the corresponding duplicated output transmission line; and
      a plurality of second splitters, each of said plurality of second splitters splitting an optical signal regenerated by corresponding regenerator and guiding the split signals to said first multiplexer and said second multiplexer, respectively.

2. An optical cross-connect device accommodating a plurality of sets of duplicated input transmission lines and a plurality of sets of duplicated output transmission lines, comprising:
a first main switch;
a second main switch;
a plurality of input circuits provided for corresponding duplicated input transmission line; and
a plurality of output circuits provided for corresponding duplicated output transmission line, wherein
each of said input circuits further comprising an optical circuit for guiding a plurality of signal lights included in WDM light received through a corresponding duplicated input transmission line to said first main switch and said second main switch, and wherein
each of said output circuits further comprising:
a plurality of selectors, each of said plurality of selectors selecting either an optical signal from said first main switch or an optical signal from said second main switch;
a plurality of regenerators, each of said plurality of regenerators regenerating an optical signal with a respective output wavelength based on an optical signal selected by corresponding selector;
a first multiplexer for multiplexing a plurality of optical signals and guiding the multiplexed signal to a first output transmission line in a corresponding duplicated output transmission line;
a second multiplexer for multiplexing a plurality of optical signals and guiding the multiplexed signal to a second output transmission line in the corresponding duplicated output transmission line; and
a plurality of splitters, each of said plurality of splitters splitting an optical signal generated by corresponding generator and guiding the split signals to said first multiplexer and said second multiplexer, respectively.

3. An optical cross-connect device accommodating a plurality of sets of duplicated input transmission lines and a plurality of sets of duplicated output transmission lines, comprising:
a first main switch;
a second main switch;
a plurality of input circuits provided for corresponding duplicated input transmission line; and
a plurality of output circuits provided for corresponding duplicated output transmission line, wherein
each of said input circuits further comprising:
a first demultiplexer for demultiplexing WDM light received from a first input transmission line in a corresponding duplicated input transmission line for each wavelength;
a second demultiplexer for demultiplexing WDM light received from a second input transmission line in the corresponding duplicated input transmission line for each wavelength; and
a plurality of first optical switches, provided for each input wavelength, each of said plurality of first optical switches guiding one of optical signals from said first demultiplexer and said second demultiplexer to said first main switch and guiding the other optical signal to said second main switch, and wherein
each of said output circuits further comprising:
a first multiplexer for multiplexing a plurality of optical signals and guiding the multiplexed signal to a first output transmission line in a corresponding duplicated output transmission line;
a second multiplexer for multiplexing a plurality of optical signals and guiding the multiplexed signal to a second output transmission line in the corresponding duplicated output transmission line; and
a plurality of second optical switches, each of said plurality of second optical switches guiding one of optical signals from said first main switch and said second main switch to said first multiplexer and guiding the other optical signal to said second multiplexer.

4. An optical cross-connect device accommodating a plurality of sets of duplicated input transmission lines and a plurality of sets of duplicated output transmission lines, comprising:
a first main switch;
a second main switch;
a plurality of input circuits provided for corresponding duplicated input transmission line; and
a plurality of output circuits provided for corresponding duplicated output transmission line, wherein
each of said input circuits further comprising:
a first demultiplexer for demultiplexing WDM light for each wavelength;
a second demultiplexer for demultiplexing WDM light for each wavelength;
a first transmission line switching circuit for guiding one of WDM lights received through a corresponding duplicated input transmission line to said first demultiplexer and guiding the other WDM light to said second demultiplexer; and
a plurality of first route switching circuits, provided for each input wavelength, each of said plurality of first route switching circuits guiding one of optical signals from said first demultiplexer and said second demultiplexer to said first main switch and guiding the other optical signal to said second main switch, and wherein
each of said output circuits further comprising:
a first multiplexer for multiplexing a plurality of optical signals to generate WDM light;
a second multiplexer for multiplexing a plurality of optical signals to generate WDM light;
a plurality of second route switching circuits, each of said plurality of second route switching circuits guiding one of optical signals from said first main switch and said second main switch to said first multiplexer and guiding the other optical signal to said second multiplexer; and
a second transmission line switching circuit for guiding one of WDM lights from said first multiplexer and said second multiplexer to a first output transmission lines in a corresponding duplicated output transmission line and guiding the other WDM light to a second output transmission lines in the corresponding duplicated output transmission line.

5. The optical cross-connect device according to claim 3, further comprising
a plurality of regenerators, each of said plurality of regenerators converting a wavelength of corresponding signal light to be guided to said first multiplexer or said second multiplexer into a respective wavelength.

6. An optical cross-connect device accommodating a plurality of sets of duplicated input transmission lines and a plurality of sets of duplicated output transmission lines, comprising:
a first main switch;
a second main switch;

a plurality of input circuits provided for corresponding duplicated input transmission line; and
a plurality of output circuits provided for corresponding duplicated output transmission line, wherein
each of said input circuits further comprising:
   a first demultiplexer for demultiplexing WDM light for each wavelength;
   a second demultiplexer for demultiplexing WDM light for each wavelength;
   a first transmission line switching circuit for guiding one of WDM lights received through a corresponding duplicated input transmission line to said first demultiplexer and guiding the other WDM light to said second demultiplexer; and
   a plurality of first route switching circuits, provided for each input wavelength, each of said plurality of first route switching circuits guiding one of optical signals from said first demultiplexer and said second demultiplexer to said first main switch and guiding the other optical signal to said second main switch, and wherein
each of said output circuits further comprising:
   a first multiplexer for multiplexing a plurality of optical signals to generate WDM light;
   a second multiplexer for multiplexing a plurality of optical signals to generate WDM light;
   a plurality of second route switching circuits, each of said plurality of second route switching circuits guiding one of optical signals from said first main switch and said second main switch to said first multiplexer and guiding the other optical signal to said second multiplexer; and
   a second transmission line switching circuit for guiding one of WDM lights from said first multiplexer and said second multiplexer to a first output transmission lines in a corresponding duplicated output transmission line and guiding the other WDM light to a second output transmission lines in the corresponding duplicated output transmission line.
further comprising
a plurality of regenerators, each of said plurality of regenerators converting a wavelength of corresponding signal light to be guided to said first multiplexer or said second multiplexer into a respective wavelength.

7. An optical cross-connect device accommodating a plurality of input transmission lines and a plurality of output transmission lines, comprising:
   a main switch;
   a plurality of input circuits provided for each of the input transmission lines; and
   a plurality of output circuits provided for each of the output transmission lines, wherein
   each of said input circuits further comprising:
      a splitter for splitting WDM light received through a corresponding input transmission line to generate first WDM light and second WDM light;
      a demultiplexer for demultiplexing the first WDM light for each wavelength and inputting the demultiplexed lights to said main switch; and
      a selector for selecting an optical signal with a designated wavelength from the second WDM light and inputting the selected signal to said main switch, and wherein
   each of said output circuits further comprising:
      a plurality of fixed wavelength converters, each of said plurality of fixed wavelength converters converting a wavelength of an optical signal from the main switch into a corresponding wavelength;
      a multiplexer for multiplexing optical signals from said plurality of fixed wavelength converters to output WDM light;
      a variable wavelength converter for converting a wavelength of an optical signal from said main switch into a designated wavelength; and
      a coupler for combining the WDM light from said multiplexer with an optical signal from the variable wavelength converter, and guiding them to a corresponding output transmission line.

8. The optical cross-connect device according to claim 7, wherein an optical amplifier is provided between said splitter and said demultiplexer, and an optical amplifier is provided between said multiplexer and said coupler.

9. The optical cross-connect device according to claim 7, wherein an optical amplifier is provided before said splitter and an optical amplifier is provided after said coupler.

10. An optical cross-connect device accommodating a plurality of input transmission lines and a plurality of output transmission lines, comprising:
   a main switch;
   an input circuit for demultiplexing WDM light received through a corresponding input transmission line and inputting the demultiplexed lights to said main switch; and
   an output circuit for multiplexing a plurality of signal lights from said main switch and guiding the multiplexed light to a corresponding output transmission line, wherein
   said input circuit further comprising:
      a splitter for splitting WDM light received through a corresponding input transmission line to generate first WDM light and second WDM light;
      a demultiplexer for demultiplexing the first WDM light for each wavelength and inputting the demultiplexed lights to said main switch; and
      a selector for selecting an optical signal with a designated wavelength from the second WDM light and inputting the selected signal to said main switch.

11. An optical cross-connect device accommodating a plurality of input transmission lines and a plurality of output transmission lines, comprising:
   a main switch;
   an input circuit for demultiplexing WDM light received through a corresponding input transmission line and inputting the demultiplexed lights to said main switch; and
   an output circuit for multiplexing a plurality of signal lights from said main switch and guiding the multiplexed light to a corresponding output transmission line, wherein
   said output circuit further comprising:
      a plurality of fixed wavelength converters, each of said plurality of fixed wavelength converters converting a wavelength of an optical signal from the main switch into a corresponding wavelength;
      a multiplexer for multiplexing optical signals from said plurality of fixed wavelength converters to output WDM light;
      a variable wavelength converter for converting a wavelength of an optical signal from said main switch into a designated wavelength; and
      a coupler for combining the WDM light from said multiplexer with an optical signal from the variable wavelength converter, and guiding them to a corresponding output transmission line.

12. An optical cross-connect device accommodating a plurality of sets of duplicated input transmission lines and a plurality of sets of duplicated output transmission lines, comprising:
a first main switch;
a second main switch;
a plurality of input circuits provided for corresponding duplicated input transmission line; and
a plurality of output circuits provided for corresponding duplicated output transmission line, wherein
each of said input circuits further comprising:
a first demultiplexer for demultiplexing WDM light received from a first input transmission line in a corresponding duplicated input transmission line for each wavelength;
a second demultiplexer for demultiplexing WDM light received from a second input transmission line in the corresponding duplicated input transmission line for each wavelength;
a plurality of first selectors, provided for each input wavelength, each of said plurality of first selectors selecting either an optical signal from said first demultiplexer or an optical signal from said second demultiplexer; and
a plurality of optical first splitters, each of said plurality of optical first splitters splitting an optical signal selected by corresponding first selectors and guiding the split signals to said first main switch and said second main switch, respectively, and wherein
each of said output circuits further comprising:
a plurality of second selectors, each of said plurality of second selectors selecting either an optical signal from said first main switch or an optical signal from said second main switch;
a plurality of regenerators, each of said plurality of regenerators regenerating an optical signal with a respective output wavelength based on an optical signal selected by corresponding second selector;
a first multiplexer for multiplexing a plurality of optical signals and guiding the multiplexed signal to a first output transmission line in a corresponding duplicated output transmission line;
a second multiplexer for multiplexing a plurality of optical signals and guiding the multiplexed signal to a second output transmission line in the corresponding duplicated output transmission line; and
a plurality of second splitters, each of said plurality of second splitters splitting an optical signal regenerated by corresponding regenerator and guiding the split signals to said first multiplexer and said second multiplexer, respectively, and
wherein each of said input circuits further comprises:
first means for selecting an optical signal with a designated wavelength from WDM light received through the first input transmission line or the second input transmission line; and
second means for splitting the optical signal selected by said first means, and guiding the split signals to said first main switch and said second main switch, respectively, and
each of said output circuits further comprises:
third means for converting a wavelength of an optical signal from said first main switch or said second main switch into a designated wavelength; and
fourth means for combining the optical signal from said third means with each of the outputs of said first and second multiplexers, respectively.

13. An optical cross-connect device accommodating a plurality of sets of duplicated input transmission lines and a plurality of sets of duplicated output transmission lines, comprising:
a first main switch;
a second main switch;
a plurality of input circuits provided for corresponding duplicated input transmission line; and
a plurality of output circuits provided for corresponding duplicated output transmission line, wherein
each of said input circuits further comprising:
a first demultiplexer for demultiplexing WDM light received from a first input transmission line in a corresponding duplicated input transmission line for each wavelength;
a second demultiplexer for demultiplexing WDM light received from a second input transmission line in the corresponding duplicated input transmission line for each wavelength; and
a plurality of first optical switches, provided for each input wavelength, each of said plurality of first optical switches guiding one of optical signals from said first demultiplexer and said second demultiplexer to said first main switch and guiding the other optical signal to said second main switch, and wherein
each of said output circuits further comprising:
a first multiplexer for multiplexing a plurality of optical signals and guiding the multiplexed signal to a first output transmission line in a corresponding duplicated output transmission line;
a second multiplexer for multiplexing a plurality of optical signals and guiding the multiplexed signal to a second output transmission line in the corresponding duplicated output transmission line; and
a plurality of second optical switches, each of said plurality of second optical switches guiding one of optical signals from said first main switch and said second main switch to said first multiplexer and guiding the other optical signal to said second multiplexer, and
wherein each of said input circuits further comprises:
first means for selecting one set of optical signals each with a designated wavelength from one set of WDM light received through the first and second input transmission lines; and
second means for guiding one of the optical signals selected by said first means to said first main switch and guiding the other optical signal to said second main switch, and wherein
each of said output circuits further comprises:
third means for guiding one of the optical signals from said first and second main switches to the first output transmission line and guiding the other optical signal to the second output transmission line;
fourth means for converting wavelengths of optical signals from said third means into designated wavelengths, respectively; and
fifth means for combining the optical signals from said forth means with the outputs of said first and second multiplexers, respectively.

14. An optical cross-connect device accommodating a plurality of sets of duplicated input transmission lines and a plurality of sets of duplicated output transmission lines, comprising:
a first main switch;
a second main switch;

a plurality of input circuits provided for corresponding duplicated input transmission line; and a plurality of output circuits provided for corresponding duplicated output transmission line, wherein each of said input circuits further comprising:
- a first demultiplexer for demultiplexing WDM light for each wavelength;
- a second demultiplexer for demultiplexing WDM light for each wavelength;
- a first transmission line switching circuit for guiding one of WDM lights received through a corresponding duplicated input transmission line to said first demultiplexer and guiding the other WDM light to said second demultiplexer; and
- a plurality of first route switching circuits, provided for each input wavelength, each of said plurality of first route switching circuits guiding one of optical signals from said first demultiplexer and said second demultiplexer to said first main switch and guiding the other optical signal to said second main switch, and wherein each of said output circuits further comprising:
- a first multiplexer for multiplexing a plurality of optical signals to generate WDM light;
- a second multiplexer for multiplexing a plurality of optical signals to generate WDM light;
- a plurality of second route switching circuits, each of said plurality of second route switching circuits guiding one of optical signals from said first main switch and said second main switch to said first multiplexer and guiding the other optical signal to said second multiplexer; and
- a second transmission line switching circuit for guiding one of WDM lights from said first multiplexer and said second multiplexer to a first output transmission lines in a corresponding duplicated output transmission line and guiding the other WDM light to a second output transmission lines in the corresponding duplicated output transmission line, and wherein each of said input circuits further comprises:
- first means for selecting one set of optical signals with a designated wavelength from one set of WDM lights from said first transmission line switching circuit; and
- second means for guiding one of the optical signals selected by said first means to said first main switch and guiding the other optical signal to said second main switch, and wherein
- third means for guiding one of the optical signals from said first and second main switches to an output of said first multiplexer and guiding the other optical signal to an output of said second multiplexer;
- fourth means for converting wavelengths of optical signals from said third means into designated wavelengths, respectively; and
- fifth means for combining the optical signals from said forth means with the outputs of said first and second multiplexers, respectively.

15. The optical cross-connect device according to claim 1, wherein
said input circuit further comprises an optical amplifier amplifying WDM light.

16. The optical cross-connect device according to claim 1, wherein
said input circuit further comprises a plurality of optical amplifiers amplifying optical signals obtained by demultiplexing WDM light for each wavelength.

17. The optical cross-connect device according to claim 1, wherein
said output circuit further comprises an optical amplifier amplifying WDM light.

18. The optical cross-connect device according to claim 1, wherein
said regenerator converts a received optical signal into an electric signal, converts the electric signal into an optical signal and outputs the converted optical signal.

19. An optical cross-connect device accommodating k sets of duplicated input transmission lines and k sets of duplicated output transmission lines that transmit WDM light including n wavelengths where k and n are integers equal to or larger than 2, said device comprising:
- a first main switch;
- a second main switch;
- 2k demultiplexers, each of said demultiplexers demultiplexing input WDM light;
- kn first selectors, each of said first selectors selecting one optical signal from corresponding set of optical signals from said 2k demultiplexers;
- kn first splitters, each of said first splitters splitting an optical signal from corresponding first selector and guiding the split signals to said first and second main switches, respectively;
- kn second selectors, each of said second selector selecting one optical signal from corresponding set of optical signals output from said first and second main switches;
- kn regenerators, each of said regenerators regenerating an optical signal with a respective wavelength based on an optical signal from corresponding second selector;
- kn second splitters, each of said second splitters splitting an optical signal regenerated by corresponding regenerator; and
- 2k multiplexers, each of said multiplexers multiplexing optical signals from corresponding second splitters to generate WDM light.

20. An optical cross-connect device accommodating k sets of duplicated input transmission lines and k sets of duplicated output transmission lines that transmit WDM light including n wavelengths where k and n are integers equal to or larger than 2, comprising;
- a first main switch;
- a second main switch;
- 2k demultiplexers, each of said demultiplexers demultiplexing input WDM light;
- kn first switching circuits, each of said first switching circuits guiding corresponding set of optical signals from said 2k demultiplexers to said first and second main switches;
- kn second switching circuits, each of said second switching circuits switching output lines on which corresponding set of optical signals from said first and second main switches are to be transmitted;
- 2kn regenerator, each of said regenerators re generating an optical signal with a respective wavelength based on an optical signal from corresponding second switching circuit; and
- 2k multiplexers, each of said multiplexers multiplexing optical signals generated by corresponding generators to output WDM light.

* * * * *

UNITED STATES PATENT AND TRADEMARK OFFICE
CERTIFICATE OF CORRECTION

PATENT NO. : 7,146,102 B2
APPLICATION NO. : 10/265255
DATED : December 5, 2006
INVENTOR(S) : Tetsuya Nishi et al.

It is certified that error appears in the above-identified patent and that said Letters Patent is hereby corrected as shown below:

Column 23, Line 39, after "line" change "." to --,--.

Column 26, Line 60, change "forth" to --fourth--.

Column 27, Line 59, change "forth" to --fourth--.

Column 28, Line 45, after "comprising" change ";" to --:--.

Column 28, Line 57, change "re generating" to --regenerating--.

Signed and Sealed this

Third Day of April, 2007

JON W. DUDAS
*Director of the United States Patent and Trademark Office*